US008451277B2

(12) United States Patent
Whited et al.

(10) Patent No.: US 8,451,277 B2
(45) Date of Patent: May 28, 2013

(54) TIGHT INBETWEENING

(75) Inventors: Brian Whited, Atlanta, GA (US); Jarek Rossignac, Atlanta, GA (US); Maryann Simmons, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 900 days.

(21) Appl. No.: 12/509,382

(22) Filed: Jul. 24, 2009

(65) Prior Publication Data

US 2011/0018880 A1    Jan. 27, 2011

(51) Int. Cl.
*G06T 13/20* (2011.01)
*G06T 15/00* (2011.01)

(52) U.S. Cl.
USPC .......................................... 345/473; 345/419

(58) Field of Classification Search
None
See application file for complete search history.

(56) References Cited

U.S. PATENT DOCUMENTS

| 5,854,634 A | 12/1998 | Kroitor | |
|---|---|---|---|
| 2009/0319892 A1* | 12/2009 | Wright et al. | 715/701 |
| 2010/0194758 A1* | 8/2010 | Seah et al. | 345/441 |

OTHER PUBLICATIONS

K. Melikov, F. Tian, H. S. Seah, Q. Chen, J. Qiu. "Frame Skeleton Based Auto-Inbetweening in Computer Assisted Cel Animation". Nov. 2004. Proceedings of the 2004 International Conference on Cyberworlds. pp. 1-8.*
N. Burtnyk, M. Wein. "Interactive Skeleton Techniques for Enhancing Motion Dynamics in Key Frame Animation". Oct. 1976. Communications of the ACM. vol. 19. No. 10. pp. 564-569.*
Alexa, M., et al, "As-rigid-as-possible shape interpolation," In Proc. of ACM SIGGRAPH 2000 (2000), Computer Graphics Proceedings, Annual Conference Series, pp. 157-164.
Baxter, W., et al., "Compatible embedding for 2d shape animation," IEEE Transactions on Visualization and Computer Graphics 15, 5 (2009), pp. 867-879.
Baxter, W., et al, "Latent doodle space," Computer Graphics Forum 25, 3 (2006), pp. 477-486.
Baxter, W., et al., "N-way Morphing for 2D Animation," Computer Animation and Virtual Worlds (proc. CASA 2009), 2009, 7 pages.
Bregler, C. et al., "Turning to the masters: Motion capturing cartoons," ACM Transactions on Graphics 21, 3 (2002), pp. 399-407.
Burtnyk, N., et al, "Computer generated key frame animation," Journal of the SMPTE 80 (1971), pp. 149-153.
Burtnyk, N., et al., "Interactive skeleton techniques for enhancing motion dynamics in key frame animation," CACM (Oct. 1976), pp. 564-569.

(Continued)

*Primary Examiner* — Joni Richer
*Assistant Examiner* — Michelle Chin
(74) *Attorney, Agent, or Firm* — Kilpatrick Townsend & Stockton LLP

(57) ABSTRACT

A tool for inbetweening is provided, wherein inbetween frames are at least partly computer generated by analyzing elements of key frames to identify strokes, determining corresponding stroke pairs, computing a continuous stroke motion for each stroke pair, defined by a carrier defined by endpoints of the two strokes and, for mutual endpoints, adjusting the continuous stroke motion of the meeting strokes such that the adjustment results in the continuous stroke motion coinciding at the mutual endpoint such that the mutual endpoint would follow the same path and deforming the stroke as it is moved by the stroke motion, wherein the deformation is a weighted combination of deformations, each reconstructed using shape descriptors that are interpolated from the shape descriptors of the corresponding samples on the key frames, wherein the shape descriptors are computed from neighboring sample points in the cyclic order of samples along the stroke.

41 Claims, 10 Drawing Sheets

OTHER PUBLICATIONS

Carr, J. C., et al., "Reconstruction and representation of 3d objects with radial basis functions," In Proceedings of ACM SIGGRAPH 2001, Computer Graphics Proceedings, Annual Conference Series, pp. 67-76.

Catmull, E., "The problems of computer-assisted animation," In Proc. of SIGGRAPH 1978 (1978), Computer Graphics Proceedings, Annual Conference Series, pp. 348-353.

De Juan, C. N., et al., "Re-using traditional animation: Methods for semi-automatic segmentation and inbetweening," In Proceedings of Symposium on Computer Animation 2006 (2005), 11 pages.

Durand, C., "The toon project: Requirements for a computerized 2d animation system," Computers & Graphics 15, 2 (1991), pp. 285-293.

Fekete, J., et al., "Tictactoon: A paperless system for professional 2d animation," In Proc. of SIGGRAPH 1995 (1995), Computer Graphics Proceedings, Annual Conference Series, 12 pages.

Fu, H., et al., Morphing with laplacian coordinates and spatial-temporal texture,: Proceedings of Pacific Graphics 2005 (2005), pp. 100-102.

Kochanek, D., et al., "A Computer System for Smooth Keyframe Animation," Tech. Rep. CS-82-42, University of Waterloo, 1982, 90 pages.

Kort, A., "Computer aided inbetweening," In NPAR '02: Proceedings of the 2nd international symposium on Non-photorealistic animation and rendering (2002), pp. 125-132, http://doi.acm.org/10.1145/508530.508552.

Lasseter, J., "Principles of traditional animation applied to 3d computer animation," in Proceedings of SIGGRAPH 1987, ACM Press / ACM SIGGRAPH, Computer Graphics Proceedings, Annual Conference Series, ACM, pp. 35-44.

Levoy, M., "A color animation system: based on the multiplane technique," In Proc. of SIGGRAPH 1977 (1977), Computer Graphics Proc., Annual Conference Series, pp. 65-71.

Llamas, I., et al., "Twister: A space-warp operator for the two-handed editing of 3d shapes," In Proc. of ACM SIGGRAPH 2003 (2003), Computer Graphics Proceedings, Annual Conference Series, pp. 663-668.

Mahajan, D., et al., "Moving gradients: a path-based method for plausible image interpolation," In Proc. of SIG-GRAPH 2009 (2009), Computer Graphics Proceedings, Annual Conference Series, 11 pages.

Miura, T., et al., "An application of hybrid curve generation: cartoon animation by electronic computers," In AFIPS '67 (Spring): Proceedings of the Apr. 18-20, 1967, Spring Joint Computer Conference (1967), pp. 141-148.

Melikhov, K., et al., "Frame skeleton based auto-inbetweening in computer assisted cel animation," In CW '04: Proceedings of the 2004 Intl. Conference on Cyberworlds (2004), IEEE Computer Society, pp. 216-223.

Pervouchine, V., et al., "Handwritten character skeletonisation for forensic document analysis, " In SAC '05: Proceedings of the 2005 ACM Symposium on Applied Computing, ACM, New York, NY, USA, pp. 754-758.

Reeves, W., "Inbetweening for computer animation utilizing moving point constraints," In Proc. of SIGGRAPH 1981 (1981), Computer Graphics Proceedings, Annual Conference Series, pp. 263-269.

Sýkora, D., et al., "As-rigid-as-possible image registration for hand-drawn cartoon animations,"In NPAR '09: Proceedings of the 7th Intl. Symposium on Non-Photorealistic Animation and Rendering (2009), pp. 25-33.

Surazhsky, T., et al., "Metamorphosis of planar parametric curves via curvature interpolation," Intl. J. of Shape Modeling 8(2) (2002), pp. 201-216.

Sederberg, T. W., et al., "2-d shape blending: an intrinsic solution to the vertex path problem," In Proc. of SIGGRAPH 1993 (1993), Computer Graphics Proceedings, Annual Conference Series, pp. 15-18.

Sederberg, T. W., et al., "A physically based approach to 2d shape blending," In Proceedings of SIGGRAPH 1992, ACM Press / ACM SIGGRAPH, Computer Graphics Proceedings, Annual Conference Series, ACM, pp. 25-34.

Sebastian, T. B., et al., "On aligning curves," IEEE Trans. Pattern Anal. Mach. Intell. 25, 1 (2003), pp. 116-125.

Singh, K., et al., "Wires: A geometric deformation technique," In Proceedings of ACM SIGGRAPH 1998, Computer Graphics Proceedings, Annual Conference Series, 10 pages.

Sumner, R. W., et al., "Mesh-based inverse kinematics," ACM Transactions on Graphics 24, 3 (2005), pp. 488-495.

Veltkamp, R., "Shape matching: similarity measures and algorithms," In Shape Modeling and Applications, SMI 2001 Intl. Conference (May 2001), pp. 188-197.

* cited by examiner

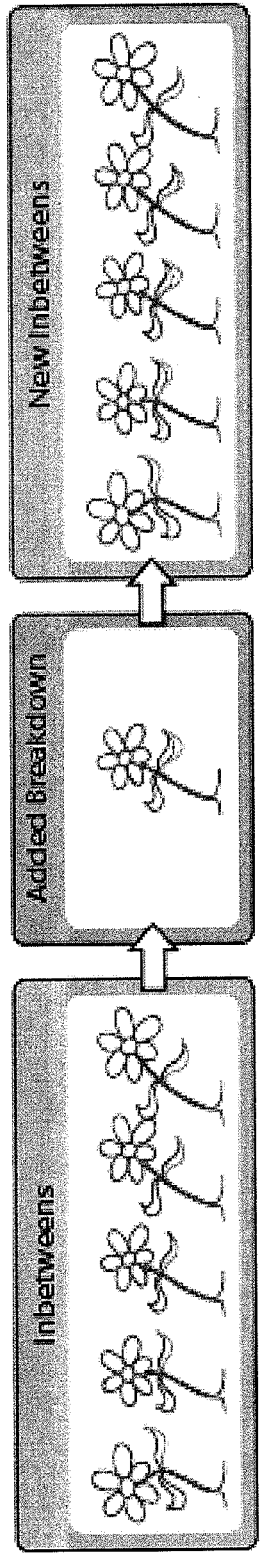
FIG. 5F
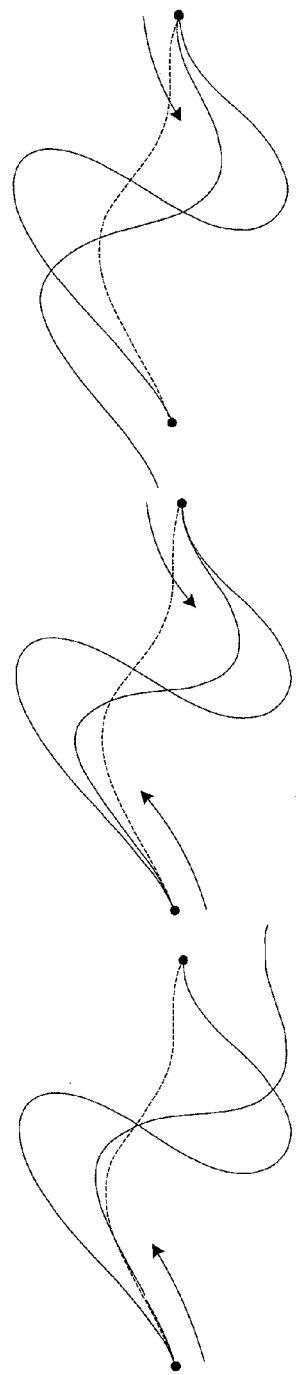
FIG. 6
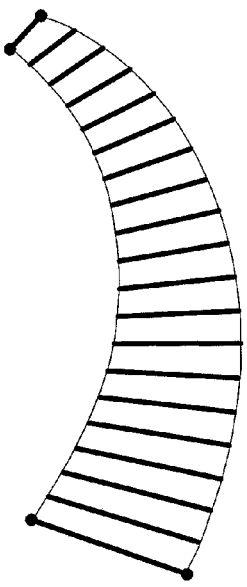
FIG. 7
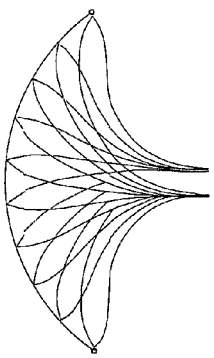

TIGHT INBETWEENING

BACKGROUND

The present invention relates to computer-assisted animation in general and in particular to computer-assisted generation of inbetween frames that fill an animation sequence between key frames.

It is well known that an animated visual presentation can be created by creating individual static images (frames) and it is also well known that it requires a substantial amount of manual labor to create each frame in, for example, a feature length film. Often, what is done is that a subset of the frames at key action points are drawn first (the "key frames" in animation terminology) and then the remaining "inbetween frames" are created to fill in the intermediate motion between key frames.

"Inbetweening" is a process in the typical animation production pipeline, wherein an animator produces drawings at key frames that capture the heart of the animated motion and an "inbetweener" artist then draws the inbetween frames at specified time intervals between each pair of key frames that fill in the intermediate motion. In the general case, an inbetween frame is based on two or more key frames.

In general, each frame has an associated time and the animation is played by presenting frames in order according to their associated time. The time differences between adjacent frames need not be the same, but often it is, such as with feature films where each frame is designed to be presented $\frac{1}{24}$th of a second after the presentation of the previous frame. Of course, frames are often not presented instantaneously and the same animation can run at different speeds, but for the purposes of generating animation, it is often sufficient just to refer to the "animation time" of a frame. For example, it is enough information to know just that one key frame is at time $t=0$, another key frame is at time $t=1$ and an inbetween frame is to be generated for time $t=\frac{1}{3}$ without considering the units of time.

Inbetween frames, or "inbetweens", are considered "tight" when they are in the animation sequence between very similar key frames. Tight inbetweens are tedious for artists to draw because they require the greatest amount of precision and the least amount of artist interpretation. Where the animation comprises two-dimensional illustrations of three-dimensional scenes, moving objects in the scene can rotate or change shape and it is preferred that such movement be illustrated in the animation in a natural way (such as according to the laws of physics or according to the artificial or imagined "physics" of characters or objects in an animation). Herein, a tight inbetween is defined as one that is close in shape with little to no topological changes (e.g., as produced by visibility changes where a portion of the character is visible in one drawing and not in the other), but it should be understood that similar problems exist with non-tight inbetweens and might find benefit with similar solutions presented here.

The manual production of inbetween frames is both difficult and time-consuming, requiring many hours of intensive labor by skilled professionals. Furthermore, its cost is a significant part of the total production budget. A full-length feature animation might require inbetweening of over a million drawings, with typical ratios of 3-4 inbetweens for each key frame. Consequently, researchers have long sought an automatic solution. Despite a large body of work in this area spanning over four decades, no definitive solution exists. This is in part because the problem is ill-posed—there is no concise set of rules for producing high-quality inbetweens, especially in cases of complex motion and changing occlusion. The artist relies on his or her perspective of the 3D world in which the animated characters are embedded, as well as on an artistic vision for achieving the desired aesthetics. It would be insufficient to derive the three dimensional world from the drawings, even if it were possible, as most often the characters have their own, undefined, laws of physics and deformation.

REFERENCES

Examples of previous approaches and general description of problems and terminology in this space can be found in the literature, such as the references cited below:

[Alexa] Alexa, M., Cohen-Or, D., Levin, D., "As-Rigid-as-Possible Shape Interpolation," *Proceedings of ACM SIGGRAPH* 2000, Computer Graphics Proceedings, Annual Conference Series, 157-164 (2000).

[Baxter] Baxter, W., Barla, P., and Anjyo, K.-I., "Compatible Embedding For 2D Shape Animation," Tech. Rep., OLMTRE-2008-001, OLM Digital, Inc. (2008).

[Bregler] Bregler, C., Loeb, L., Chuang, E., and Deshpande, H., "Turning to the Masters: Motion Capturing Cartoons," *ACM Transactions on Graphics* 21, 3 (July), 399-407 (2002).

[Burtnyk71] Burtnyk, N., and Wein, M., "Computer Generated Key Frame Animation," *J. Soc. Motion Picture and Television Engineers* 80, 3, 149-153 (1971).

[Burtnyk76] Burtnyk, N., and Wein, M., "Interactive Skeleton Techniques for Enhancing Motion Dynamics in Key Frame Animation," *Communications of the ACM*, v. 19, n. 10, pp. 564-569, October (1976).

[Carr] Carr, J. C., Beatson, R. K., Cherrie, J. B., Mitchell, T. J., Fright, W. R., McCallum, B. C., and Evans, T. R., "Reconstruction and Representation of 3D Objects with Radial Basis Functions," *Proceedings of ACM SIGGRAPH* 2001, Computer Graphics Proceedings, Annual Conference Series, 67-76, August (2001).

[Catmull] Catmull, E., "The Problems of Computer Assisted Animation," in *Proceedings of SIGGRAPH* 1978, ACM Press/ACM SIGGRAPH, Computer Graphics Proceedings, Annual Conference Series, ACM, v. 12, n. 3, 348-353, August (1978).

[de Juan] de Juan, C. N., and Bodenheimer, B., "Re-using Traditional Animation: Methods for Semi-Automatic Segmentation and Inbetweening," in *Proceedings of Symposium on Computer Animation* 2006, Eurographics/ACM SIGGRAPH, 100-102 (2005).

[Durand] Durand, C. X., "The 'Toon' Project: Requirements for a Computerized 2D Animation System," *Computers & Graphics* 15, 2, 285-293 (1991).

[Fekete] Fekete, J., Bizouarn, E., Coumaire, É., Galas, T., and Taillefer, F., "TicTacToon: A Paperless System for Professional 2D Animation," in *Proceedings of SIGGRAPH* 1995, ACM Press/ACM SIGGRAPH, Computer Graphics Proceedings, Annual Conference Series, ACM, 79-90, September (1995).

[Fu] Fu, H., Tai, C.-L., and Au, O. K.-C., "Morphing with Laplacian Coordinates and Spatial-Temporal Texture," in *Proceedings of Pacific Graphics* 2005, 100-102 (2005).

[Johnston] Johnston, O., and Thomas, F., *The Illusion of Life: Disney Animation*, Disney Press (1995).

[Kochanek] Kochanek, D., Bartels, R., and Booth, K., "A Computer System for Smooth Key Frame Animation," Tech. Rep. CS-82-42, University of Waterloo (1982).

[Kort] Kort, A., "Computer aided inbetweening," in *NPAR '02: Proceedings of the 2nd International Symposium on Non-photorealistic Animation and Rendering*, ACM, 125-132 (2002).

[Lasseter] Lasseter, J., "Principles of Traditional Animation Applied to 3D Computer Animation," in *Proceedings of SIGGRAPH* 1987, ACM Press/ACM SIGGRAPH, Computer Graphics Proceedings, Annual Conference Series, ACM, 35-44 (1987).

[Levoy] Levoy, M., "A Color Animation System: Based on the Multiplane Technique," in *SIGGRAPH '77: Proceedings of the 4th Annual Conference on Computer Graphics and Interactive Techniques*, ACM, New York, N.Y., USA, 65-71 (1977).

[Melikhov] Melikhov, K., Tian, F., Seah, H. S., Chen, Q., and Qiu, J., "Frame Skeleton Based Auto-Inbetweening in Computer Assisted Cel Animation," in *CW '04: Proceedings of the 2004 International Conference on Cyberworlds*, IEEE Computer Society, 216-223 (2004).

[Miura] Miura, T., Iwata, J., and Tsuda, J., "An Application of Hybrid Curve Generation: Cartoon Animation by Electronic Computers" in *AFIPS '67 (Spring): Proceedings of the Apr. 18 20, 1967, Spring Joint Computer Conference*, ACM, New York, N.Y., USA, 141-148 (1967).

[Noris] Noris, G., "Computer Assisted Cartooning," Master's thesis, ETH Swiss Federal Institute of Technology (2008).

[Pervouchine] Pervouchine, V., Leedham, G., and Melikhov, K., "Handwritten Character Skeletonisation for Forensic Document Analysis," in *SAC '05: Proceedings of the 2005 ACM Symposium on Applied Computing*, ACM, New York, N.Y., USA, 754-758 (2005).

[Reeves] Reeves, W., "Inbetweening for Computer Animation Utilizing Moving Point Constraints," in *Proceedings of SIGGRAPH* 1981, ACM Press/ACM SIGGRAPH, Computer Graphics Proceedings, Annual Conference Series, ACM, 263-270 (1981).

[Sederberg] Sederberg, T. W., and Greenwood, E., "A Physically Based Approach to 2d Shape Blending," in *Proceedings of SIGGRAPH* 1992, ACM Press/ACM SIGGRAPH, Computer Graphics Proceedings, Annual Conference Series, ACM, Vol. 26, 25-34 (1992).

[Singh] Singh, K., and Fiume, E. L., "Wires: A Geometric Deformation Technique," in *Proceedings of ACM SIGGRAPH* 1998, Computer Graphics Proceedings, Annual Conference Series, 405-414 (1998).

[Sumner] Sumner, R. W., Zwicker, M., Gotsman, C., and Popović, J., "Mesh Based Inverse Kinematics," *ACM Transactions on Graphics* 24, 3 (August), 488-495 (2005).

[Surazhsky] Surazhsky, T., and Elber, G., "Metamorphosis of Planar Parametric Curves Via Curvature Interpolation," *International Journal of Shape Modeling*, 8, 2, 201-216 (2002).

Conventional Inbetweening

There are previously known techniques for automatic and semi-automatic inbetweening of pairs of key drawings. Inbetweening is an art and artist input might always be necessary to a polished final product. However, if some of the tedious and high-precision tasks can be passed on to a computer and still allow for user input, the process would be more efficient and might allow artists more time to focus their efforts on areas where their creative talents and expertise are needed to produce the highest quality results.

Overview of 2D Production Workflow

While some of the underlying mechanisms have benefitted from the advent of digital technology, a 2D production today follows much the same basic workflow as traditional animation. [Johnston]. In this workflow, a storyboard provides a visual representation of the story or script. In layout, the staging for each scene is designed, including establishing the setting, choosing and placing character and prop elements, and specifying camera motion and cuts. Backgrounds are painted in their own layers based on the layout drawings. An animation sequence is represented by frame images generated from the drawings, wherein each frame has an animation time.

Character and effects animation is then done in multiple stages. First, animators produce the subset of drawings that lay down the core of the action, i.e., the key frames. These extreme drawings are often "ruff" versions that capture the spirit, flow, and arcs of the animation. A clean up artist is responsible for taking the ruff drawings and producing clean lines that remain true to the original action. The cleanup artist is also responsible for keeping the character "on model", so that all drawings, even those done by different animators, maintain a consistent look.

It is then the job of the inbetweening artist to produce the inbetween frames. In many of the examples herein, an inbetween frame is drawn considering only the two key frames that the inbetween frame is between in the animation sequence, but that does not preclude some inbetween frames from being created taking into account more remote (in time) key frames. In any case, good inbetween frames are needed to produce seamless motion. These transitional drawings that form the inbetween frames should remain true to the motion specified in the key frames, and should not detract from the action. The artists flip the drawings as they work to ensure continuity and flow. Ultimately the drawings go to ink and paint where regions are filled in with color. For this reason, most drawn areas represent closed regions that must be maintained closed as well.

Each key drawing may have one or more timing charts associated with it. The animator uses these charts to specify how many inbetween drawings should be produced between key frames, and at what intervals. Different parts of the drawing may have different timing charts. For example, a character's hands might be gesticulating wildly while the rest of the body moves slowly. Hence, only two key frames may suffice to specify the movement of the body, while several key frames might be necessary over the same period of time to precisely define the motion of the hand.

There is a wide range of scenarios presented by the key frames. When inbetweens are needed for dramatically different key drawings, advanced artistic skill and interpretation are required to produce satisfactory intermediate frames. In these cases, a further "breakdown" might be done, where the artist produces those frames within the range that present special drawing problems. Tight inbetweens require less artistic interpretation—but considerable technical skill to lay down the lines accurately. These drawings are often identified by the artist as both time-consuming and tedious.

The inbetween frames represent a significant portion of the drawings, budget, and time for a production. A typical feature may average 4 drawings per frame (for different characters, props, etc.). For an 80 minute feature with 24 frames displayed per second, this means 460,800 drawings per production. If a quarter of these frames are done by the animators, then that leaves 345,600 drawings for the inbetweening artists. Practically, the actual numbers are far greater—as multiple drawings are often done before arriving at the final version at any stage, easily adding up to over a million inbetweened drawings per full length production. See, for example, [Johnston].

The problem of automatic 2D inbetweening dates back more than forty years to the inception of computer graphics as a field of research [Miura]. Although it was a flagship problem of the field, it remains generally unsolved today. The many challenges in automatic inbetweening have been well defined and include the information loss and ambiguity inherent in a 2D projection of a 3D character, motion involving hidden surfaces, the specification of correspondence in the presence of occlusions and topological changes [Catmull], the calculation of the trajectories of the strokes through time [Reeves], and unnatural distortion that often occurs when there is a rotational component in an object's movement [Kochanek].

Many early methods are stroke-based. They require the user to directly identify a correspondence between the strokes of adjacent key frames (e.g., [Miura], [Burtnyk71], [Levoy], [Durand]) and do not handle occlusions or topological changes. Correspondences in Reeves's method [Reeves] are indicated by a collection of curves called moving points that are sketched by the user and connect the key frames to specify both trajectory and dynamics. A cubic metric space blending algorithm is used to find the positions of the remaining points, but requires heuristics to complete the patch network defined by the key frame strokes and moving point trajectories.

[Kort] presents a user-guided inbetweening system that identifies correspondences and computes inbetweens automatically but allows the user to correct undesired correspondences, trajectories, or timing. The method is restricted to the class of animations in which occlusions are resolved via an invariant layering. Layers that break this invariance cannot be interpolated. [de Juan] presents a layered-based approach that targets the reuse of previously created 2D animation. Unlike the previous methods, their system is image-based, rather than stroke-based. Characters in completed animation frames are segmented from the background and divided into layers. Inbetweening is accomplished via radial-basis function (RBF) interpolation of the layer contours [Carr], followed by morphing of the interior texture. The RBF interpolation requires the shapes to be properly aligned, and artifacts can result from misalignments. The MeshIK system described in [Sumner] includes a boundary-based interpolation scheme that does not require alignment, but it does not address interior texture morphing.

As shown by [Baxter], compatible embedding enables a maximally rigid interpolation, as shown by [Alexa] and [Fu], that naturally blends both a shape's boundary and its interior texture. Similar methods have also been applied for cartoon capture and reuse [Bregler]. Nevertheless, methods based on texture blending are susceptible to blurring artifacts unless extreme care is taken to align internal texture features.

A final class of inbetweening systems employs skeleton-based methods for key frame interpolation. In the early work of Burtnyk and Wein [Burtnyk76], key frame components are embedded in skeletal structures that are animated directly to deform the embedded shape. This method is a precursor to the "Wires" system of [Singh], which is designed for 3D deformation. Melikhov and colleagues' [Melikhov] inbetweening work uses a skeleton concept to deform the texture surrounding hand-drawn lines. They focus on simplicity so that non-artists can use the system. Fekete and colleagues [Fekete] evaluate automatic inbetweening in the context of a paperless 2D animation system and identify several advantages and disadvantages. The advantage of reduced hand-drawn inbetweens and greater animation reuse is tempered by the need to specify correspondences, struggle with awkward timing specification, and build template models. They conclude that automatic inbetweening is no faster than performing the work by hand.

In view of the above, improved methods and apparatus for generating inbetween frames or assisting artists in generating them, are desired.

SUMMARY

An interactive tool for inbetweening in feature animations is provided, wherein inbetween frames are at least partly computer generated by analyzing elements of key frames to identify strokes, determining corresponding stroke pairs, and computing a continuous stroke motion for stroke pairs for moving a stroke from a position in the first key frame to the position of the second stroke in the second key frame, wherein the continuous stroke motion can be defined by movement of endpoints of the two strokes and adjusting the continuous endpoint motion such that endpoints of two or more strokes that are coincident in the key frames remain coincident in the continuous stroke motion, or at least coincident within a margin of error, such that the endpoint would follow the same path, within a margin of error, regardless of which of the endpoint's adjacent stroke's continuous stroke motion is used.

A computer-assisted animation system might provide a method for generating inbetween frames, wherein an inbetween frame is an image within an animation sequence that is to be displayed in sequence between two key frames drawn by an artist, and wherein the inbetween frames are to be initially at least partly computer generated. The method might include receiving a set of at least two key frames, include a first key frame that is to precede an inbetween frame set comprising at least one generated inbetween frame in the animation sequence and a second key frame that is to follow the inbetween frame set in the animation sequence, analyzing elements of the set of key frames to identify strokes in the images represented by the set of key frames, wherein a stroke is an image feature that is representable, in part, by a continuous line or curve segment and zero or more additional sample points on the line or curve segment, in addition to the endpoints. Each sample point, or curve between sample points, can have associated therewith a thickness, color and/or other line attribute, wherein a result of analyzing is the generation of a stored list of strokes, determining corresponding stroke pairs, a stroke pair comprising a first stroke of a first key frame of the set of key frames and a second stroke of a second key frame of the set of key frames, for each of a plurality of the corresponding stroke pairs, computing a continuous stroke motion for moving the endpoints of the first stroke of the stroke pair in the first key frame to the position of the endpoints of the second stroke in the second key frame, wherein the continuous stroke motion is defined by the endpoints of the first stroke and the endpoints of the second stroke, adjusting the continuous stroke motion of coincident strokes such that the adjustment results in the continuous stroke motion coinciding, or at least coinciding within a margin of error, at the endpoint such that the endpoint would follow the same path, within a margin of error, regardless of which of the endpoint's adjacent stroke's continuous stroke motion is used, determining an animation time for a desired inbetween frame relative to the animation times of the first key frame and the second key frame, determining a location of endpoints given the animation time of the desired inbetween frame and continuous stroke motion, automatically generating strokes of the desired inbetween frame from at least the determined endpoint locations, and storing the automatically generated strokes in a form that allows for later electronic editing of the desired inbetween frame.

Stroke deformation processes are also possible, wherein a stroke in the first key frame is deformed for an inbetween frame based on the stroke in the first key frame, the stroke in the second key frame, a piecewise representation of the stroke, the endpoint positions in the inbetween frame and tangent constraints. In specific embodiments, the stroke is represented by a list of line segment lengths and angles, defining a path from one endpoint to the other using local coordinates defined by adjacent points of the line segments, and stroke deformation is a process of computing shape changes to the list of line segments to match new endpoint positions and tangent constraints. The tangent constraints can be such that tangents of a stroke at its endpoints to maintain a desired relationship between a tangent angle of a first stroke at an endpoint and a tangent angle of another stroke having a coincident endpoint with the first stroke.

This system described herein provides for interactive inbetweening targeted at producing results with full automation for tight inbetweens. For more complex cases, the framework provides a context in which the artist can guide the system in a natural way to efficiently produce quality results. Generation of curved endpoint trajectories from only two key frames and single-stroke input for guiding semi-automated computation of correspondence and for matching salient points and drawing their path are provided.

The interpolation approach presented here is stroke-based, which is well suited for tight inbetweens. The following detailed description together with the accompanying drawings will provide a better understanding of the nature and advantages of the present invention.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIGS. 5A-5F provide examples of what graphical representations of possible editing operations in various tools might look like; FIG. 5A illustrates views of what a correspondence editor might display; FIG. 5B illustrates views of what a salient points editor might display; FIG. 5C illustrates views of what a timing specification editor might display; FIG. 5D illustrates views of what a trajectories editor might display; FIG. 5E illustrates views of what an occluded lines drawing editor might display; FIG. 5F illustrates views of a breakdown insertion editor might display.

FIG. 6 illustrates a curve average.

FIG. 7 illustrates an example of curve-based movement.

DETAILED DESCRIPTION OF EXEMPLARY EMBODIMENTS

The systems described herein generate, or assist with generation of, inbetween frames. As such, a user interface might be provided to accept artist input and may include output devices and/or storage, to allow for the presentation and viewing of generated inbetween frames, along with key frames, so that a human animator can assess the quality of the automatically generated inbetween frames.

Figure 1:
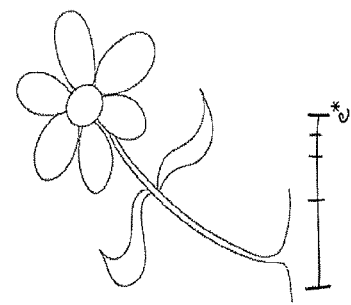
FIG. 1 illustrates an animation sequence with two key frames and three inbetween frames.
Figure 1:
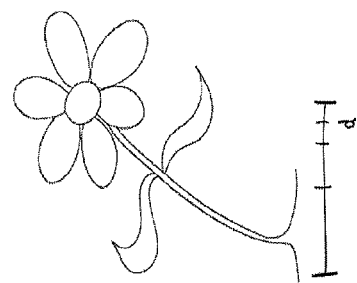
Figure 1:
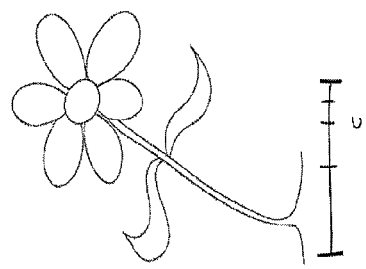
Figure 1:
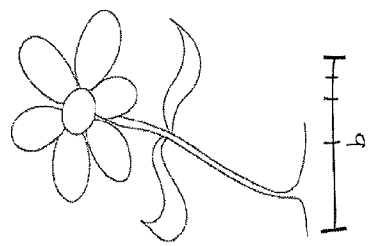
Figure 1:
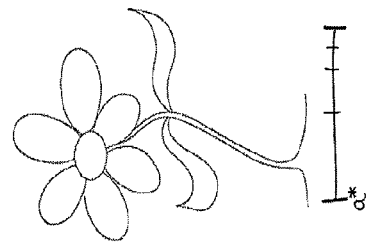

An example of an animation sequence is shown by the flower sequence in FIG. 1. There, the key frames are labeled "A" and "E" and frames B, C and D are inbetween frames. Note that the specified timing is not linear (i.e., not evenly spaced; in some embodiments, this can be required, but in others, not). For the key pair, correspondence correction strokes might be included and additional salient points added (to improve the inbetweening process).

Higher complexity images might include topological as well as occlusion challenges, requiring additional salient point edits. The framework allows the user to select desired areas and do the drawing themselves seamlessly within the automated context. This can be important if there are portions of the drawings that the artist will want to do themselves, e.g., animated facial close-ups of a main character. In some embodiments, after a stroke list is generated for an image, and possibly after inbetween frames are generated, an artist might add salient points to strokes of the key frames, to indicate important points that need to be handled carefully.

The inbetweening system, in some embodiments, converts a stroke with one salient point into two strokes, breaking at the salient point, and then processing for an inbetween frame without distinguishing salient-to-endpoint points from initial endpoints. In other embodiments, the addition of a salient point does not break a stroke, but the logic for generating inbetween frames takes into account salient point locations. Typically, when a salient point is added to stroke that has a continuous curvature from one side of the salient point to the other side, that continuity should be preserved. As explained herein, that can be done by having tangent constraints taken into account when the strokes on either side of the salient point are deformed to fit the endpoint locations in the inbetween frame.

Figure 2:
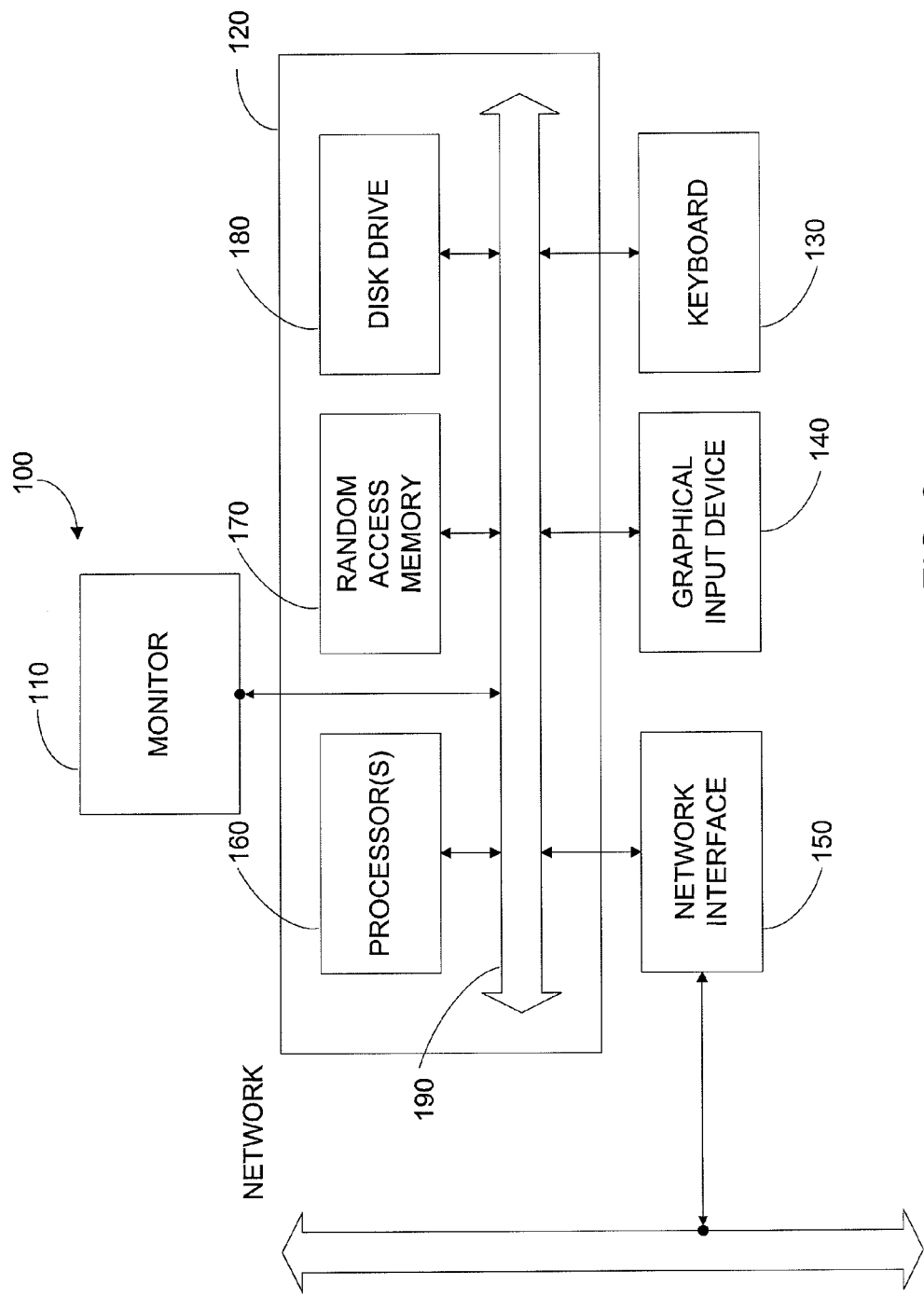
FIG. 2 illustrates an example system for animation management.

FIG. 2 illustrates an example system 100 for animation management according to an embodiment of the present invention. In the presently described embodiment, computer system 100 typically includes a monitor 110, computer 120, a keyboard 130, a user input device 140, computer interfaces 150, and the like. Images and frames can be input using a scanner (not shown), received over a network or other interface, stored in memory or hard disk storage, or drawn directly into the system where such functionality is provided. The interfaces and/or memory might also be used to provide the metadata about an image.

In various embodiments, display/monitor 110 may be embodied as a CRT display, an LCD display, a plasma display, a direct-projection or rear-projection DLP, a microdisplay, or the like. In various embodiments, monitor 110 may be used to visually display user interfaces, images, or the like as well as being part of an interactive environment that accepts artist inputs, shows results of inbetween frame generation and metadata, etc. and accepts further input.

In the present embodiment, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like as well as making moving inputs, such as signaling a curve or association of objects.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120 and/or include software drivers, or the like.

In various embodiments, computer 120 typically includes familiar computer components such as a processor 160, and memory storage devices, such as a random access memory (RAM) 170, disk drives 180, and system bus 190 interconnecting the above components. RAM 170 or other memory might hold computer instructions to be executed by one or more processors as a mechanism for effecting some functionality described herein that is implemented in software. In one embodiment, computer 120 includes one or more Core™ microprocessors from Intel. Further, in the present embodiment, computer 120 typically includes a UNIX-based operating system.

RAM 170 and disk drive 180 are examples of computer-readable tangible media configured to store embodiments of the present invention including computer-executable code implementing techniques described herein, data such as image files, object/scene models including geometric descriptions of objects, images, metadata about images and user inputs and suggestions, procedural descriptions, a rendering engine, executable computer code, and/or the like. Other types of tangible media may include magnetic storage media such as floppy disks, networked hard disks, or removable hard disks, optical storage media such as CD-ROMS, DVDs, holographic memories, and/or bar codes, semiconductor memories such as flash memories, read-only-memories (ROMS), battery-backed volatile memories, networked storage devices, and the like.

In various embodiments, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, a graphical processor unit or "GPU", may be used to accelerate various operations. Such operations may include determining stroke lists, stroke pairing, stroke motion, stroke deformation or other processes.

FIG. 2 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Itanium™ microprocessors from Intel; Turion™ 64 or Opteron™ microprocessors from Advanced Micro Devices, Inc; and the like. Further, other types of operating systems are contemplated, such as Vista™ or WindowsXP™ or the like from Microsoft Corporation, Solaris™ from Sun Microsystems, Linux, Unix, or the like. In still other embodiments, the techniques described above may be implemented upon a chip or an auxiliary processing board. Many types of configurations for computational devices can be used to implement various methods described herein. Further, processing components having different levels of computational power, e.g., microprocessors, graphics processors, RISC processors, embedded processors, or the like can also be used to implement various embodiments.

Using system 100, the two hand-drawn key frames might be vectorized and their strokes mapped to graph structures, and system 100 would determine a correspondence between the strokes of the two resulting graphs and compute an initial pass of the inbetween frames computed according to a default timing chart. While this standard operation may sometimes be sufficient, both the aesthetic desires of the artist as well as ambiguities in the frames themselves will often necessitate some user intervention. System 100 can employ a custom workflow that allows such changes to be efficiently expressed, which is described later below.

In the more general case with two key frames, the system reads in the drawings for those two key frames, the "key drawings". Key drawings might be hand-drawn and digitized, digitally generated and/or generated by an animator using a user interface tool that allows the animator to draw and add metadata about the drawing. The metadata of a key frame might include indications of which features are strokes (strokes list), which strokes connect to other strokes (stroke graph), the locations of two (or possibly one) endpoints of the stroke in a frame coordinate space (or a relative coordinate space), the locations of one or more salient points along the stroke (a stroke need not have intermediate salient points), and a list of sample points defining individual strokes, with associated line thickness, color, or other line attributes at each sample point (stroke details) along with animator indicator metadata (for example, data that the animator inputs to vary the automatic generation of inbetweens away from a default generation).

Some of this metadata might be automatically generated by system 100 from just the key drawing, some of the metadata might comprise the automatically generated metadata modified by an artist or animator after reviewing results of a default generation, and some of the metadata might be entirely entered by an artist.

The shape of individual strokes or the trajectory of a given point (endpoint, other salient point, etc.) can be specified directly via a drawing interface. The timing chart can be adjusted to reflect the desired fluidity of the scene. Ambiguities in the correspondence can be resolved, and salient points can be adjusted or added, wherein a salient point is a point (usually a sample point) on a stroke that a user can provide metadata for. The behavior of occluded strokes that appear or disappear can be specified. All sample points need not be salient points and all salient points need not be sample points, but the latter is common.

Using system 100, the process of inbetweening animated frames for characters, props, and effects, post clean-up is initially automated, but in such a way that a human user of the system can later modify the results by including metadata that would cause a different result when the process is rerun. Using these tools, the inbetweening artist is more efficient by providing tools to help automate the process where appropriate and beneficial.

Good animation of inbetweens is often the result of the inbetweening artist recognizing and reproducing the arcs of the action in the scene between the key frames. System 100 takes this guideline into account in its automated approach and, in some embodiments, the default is to move strokes using natural arcs, such as logarithmic spirals or other natural curves. A novel interpolation described herein can be used that captures these natural arcs of motion given only a pair of key frames.

Some methods described herein employ a semiautomatic correspondence algorithm that only requires user input in ambiguous cases, so that most of the stroke correspondences, i.e., the pairing of a stroke in one key frame to a stroke in another key frame, are correct before the artist needs to make edits. Interpolation is automatic and designed to follow natural motion arcs. However, system 100 also supports an optional trajectory redrawing interface that allows any trajectory to be specified by the artist, overriding the default trajectory of a stroke endpoint or salient point that the automatic process determined.

The methods described herein can be operated beyond a limitation of layers and a proposed workflow allows occlusion ambiguities to be resolved via a simple user interface.

Core Process

Figure 3:
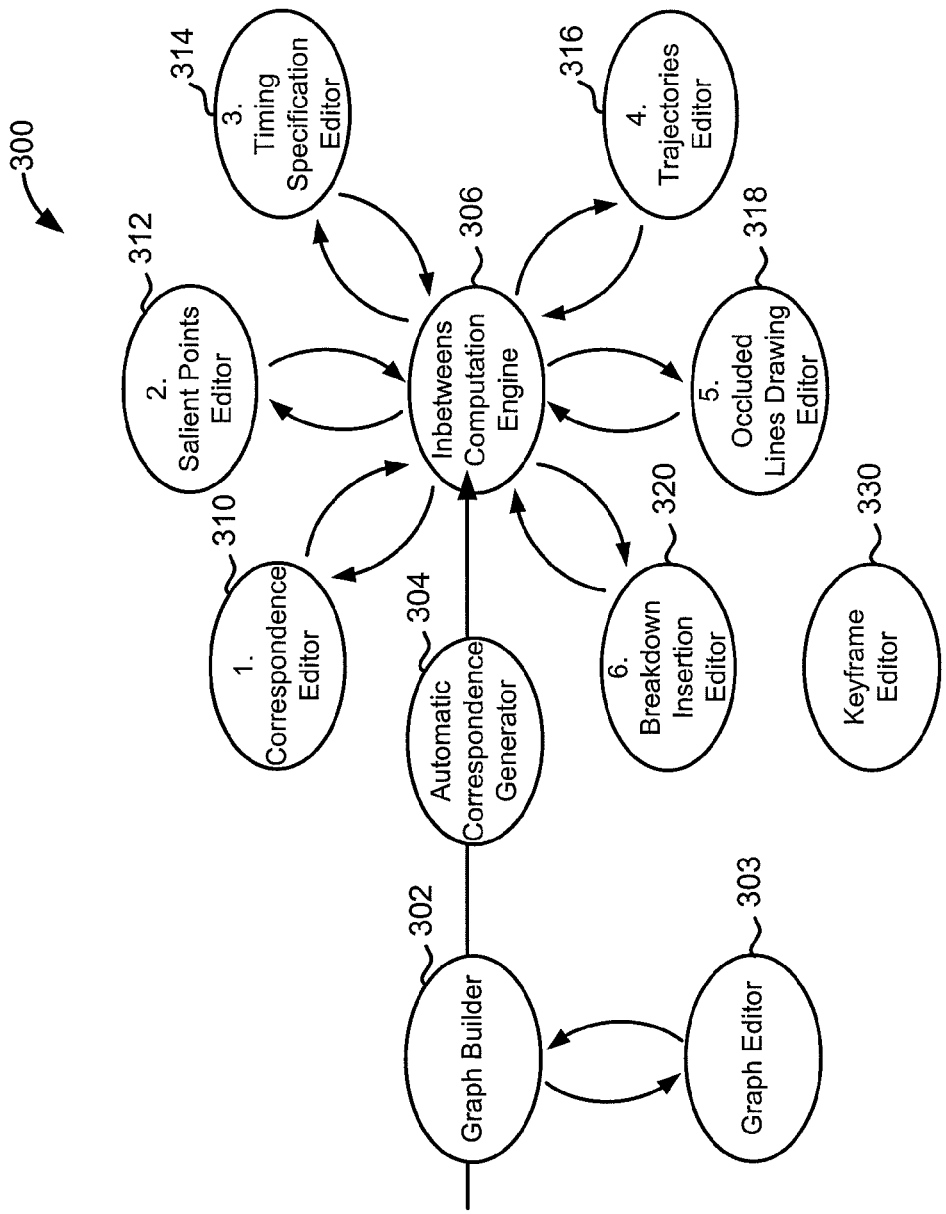
FIG. 3 illustrates an embodiment of a workflow process that might be used by an inbetweening artist.

An embodiment of a workflow process that might be used by an inbetweening artist is illustrated in FIG. 3. It should be understood that this process is tied to a computer system and/or computing device (system 300) that allows for user interaction and has an engine that can perform many computations per second as this workflow process is not amenable to be done without some sort of computational assistance. As shown in FIG. 3, system 300 begins the process with graph building (associating strokes of a key frame with other strokes in the key frame based on which strokes are attached to which other strokes or have some other constraint relationship, possibly also including deconstruction of an image into strokes). Once built, the system compares the graphs of two key frames to find "correspondences" or stroke pairs where a stroke in the first frame corresponds to a stroke in the second frame. From that metadata and the key frames themselves, the system can automatically compute an inbetween frame and present that to the inbetween artist, who can then use one or more of the following tools to add, delete or modify the metadata and rerun the automatic inbetween computation.

Typically, a graph builder 302, automatic correspondence generator 304 and inbetween computation engine 306 can run without user input to generate an initial inbetween frame, which is presented on a display device to the user, an inbetween artist, who can then use tools to change the frame. The examples of user tools provided in FIG. 3 are:

- a correspondence editor 310, which presents the user with the two key frames and indications of pairings of strokes and accepts user input directed at changes to the correspondences;
- a salient points editor 312 (which can be a distinct editor or just a distinct mode of a common editor), which presents strokes and their salient points and accepts user input directed at additions, modifications, and/or deletions of salient points;
- a timing specification editor 314;
- a trajectories editor 316, which accepts user input specifying changes to trajectories of endpoints of strokes or other salient points;
- an occluded lines drawing editor 318; and
- a breakdown insertion editor 320.

Some, all or none of these tools might be used in a given instance. An example workflow will now be described. It should be understood that each of these user tools could be hardware, software and/or firmware, typically coupled to a graphics display and user input hardware (which might be integrated in the form of a touch screen, touch pad or the like), such that the tool can present the user a view of the changes that the user is making to the metadata for the inbetween frame by using the input devices associated with those tools.

As previously mentioned, the input to the inbetweening process is two key frames of animation, each of which is a graph of strokes, but it is not impossible to use more than two key frames. This graph preferably does not have any self-intersections and may have multiple connected components. All of the edits using a graph editor 303, or any of the user tools listed above, can be done using clicks of the mouse or by using artist-friendly guide strokes. These guide strokes offer an alternative to clicking on pairs of strokes or salient points for the different operations, since clicking is often inconvenient when using a pen and tablet input device.

When the automated correspondence matching fails to match an entire feature correctly, the artist has the opportunity to trim the correspondence using correspondence editor 310 (by deleting strokes from the set matched by a correspondence tracing process (CTP, described in more detail below) and by extending the processed set of strokes (by repeatedly providing new seed, running CTP, and performing the inbetweening on the additional set). This new CTP traversal need not override previous inbetween frames and can stop once a stroke with an existing correspondence is found.

When the user desires stricter correspondence than stroke-to-stroke correspondence, the user may define additional nodes in the graph by inserting salient points along the strokes, thus effectively (or actually, depending on implementation) breaking the stroke into two smaller strokes. Salient points will often be desired at local maximum curvatures, such as at the tip of a finger or the end of a tail. The user inputs these salient points using salient points editor 312 by, for example, clicking somewhere on a stroke or drawing a curve from a point on a stroke to another point on its corresponding stroke. The latter breaks the two touched strokes into four, defining two new endpoints at the location of the new salient points, and also possibly defining the trajectory of that new graph node (corresponding to the trajectory of the new salient point) through time.

The user may also desire to merge adjacent strokes, thereby deleting an endpoint. This operation is useful when a stroke in one frame should correspond to two adjacent strokes in the other key frame that have been split by a junction with another stroke. This might be done by clicking on two adjacent strokes, or by connecting them with a guide stroke.

In practice, the timing for a set of inbetweens is specified prior to the inbetweening step. This timing information can also be specified using timing specification editor 314, in a textual timing chart file format and loaded in with the input key drawings. For total flexibility, however, the user may adjust the time parameterization before and after inbetweens have been computed. If they are already computed, they will update on the fly for immediate feedback.

Any of the automatically computed trajectories for the nodes may be edited by the user using trajectories editor 316. The input sequence might be that the user draws a stroke near the original trajectory and once the pen is lifted, the stroke scales and orients such that it fits between the locations of an endpoint in two key frames and replaces the trajectory of that endpoint. The adjacent inbetweens that are affected by this change can be recomputed immediately. These trajectories may also be redrawn while the animation is in playback mode, allowing the user to see how the change affects the motion in real-time.

In situations where a stroke is partially or totally occluded in one key frame, but not in the next or previous key frame, the graph connectivity will be locally incompatible. However, the user may use occluded lines editor 318 to extend a stroke by drawing past the point(s) of intersection with the goal of matching the corresponding key frame's topology as if there were no occlusion. It is not uncommon to see such occluded lines drawn in the traditional workflow in order to assist the animator in keeping shapes consistent.

The added stroke is then intersected with other strokes in the same frame, creating N+1 substrokes, where N is the number of intersections. Each substroke has an independent visibility toggle. By default, the substrokes toggle visibility at each intersection, which works well in the common simple case, such as in FIG. 4. As illustrated there, FIGS. 4(a) and 4

(b) represent two key frames. In the key frame of FIG. 4(a), the left petal of the flower is occluded, whereas it is not in FIG. 4(b), so a good inbetweening process will fill in the edge of the petal when appropriate. To assist with this, the user can specify the occluded stroke, illustrated in FIG. 4(c), so that the unoccluded inbetween frames include the stroke, as illustrated in FIG. 4(d), which is an overlay of all of the inbetween frame strokes.

When more control is necessary, the user may select specific substrokes to manually toggle the visibility. If such a stroke is inbetweened, the visibility can carry automatically to subsequent corresponding substrokes through time. For even further flexibility, the produced inbetween substrokes may also be toggled individually.

When two key frames or subsets of key frames are too dissimilar to be classified as "tight" and there is not enough correspondence to make good use of the user tools, the user has the option of using breakdown insertion editor 320 to insert an additional key frame for either the entire frame, or just the subset that is not tight. This is what is traditionally known as a "breakdown." This allows the user to only produce a breakdown where needed, but keep the rest of the inbetweened strokes that were tight.

For tight inbetweening, the automatic processes often produce adequate results. The treatment of more difficult cases that involve artist intervention might involve these tools to quickly produce a plausible result in most common conditions that can then be guided or edited by the artist.

Figure 5A:
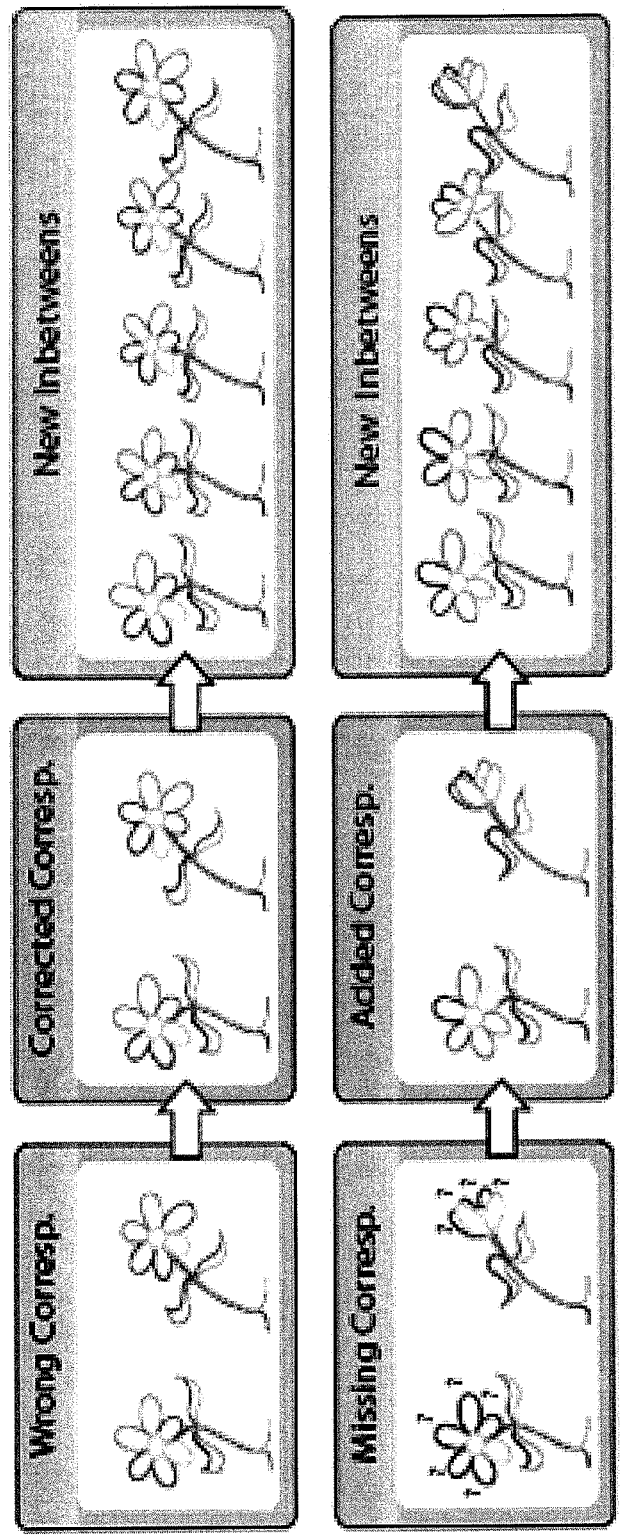
Figure 5B:
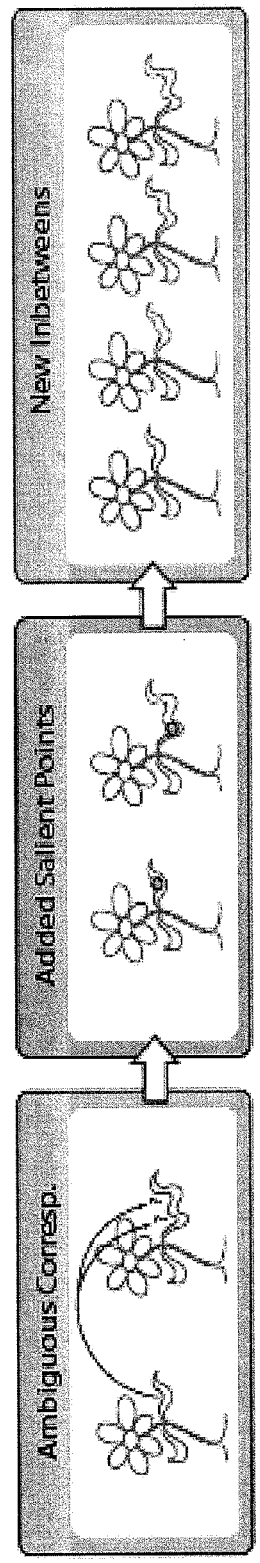
Figure 5C:
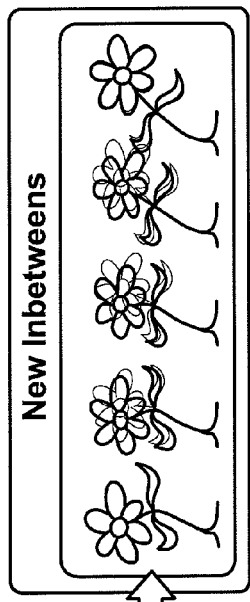
Figure 5D:
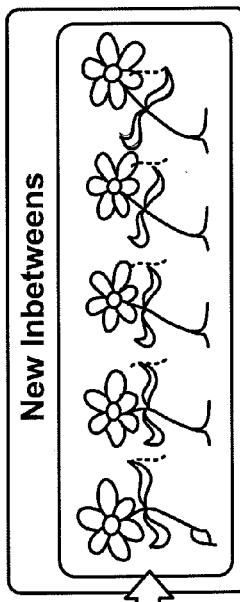
Figure 5E:
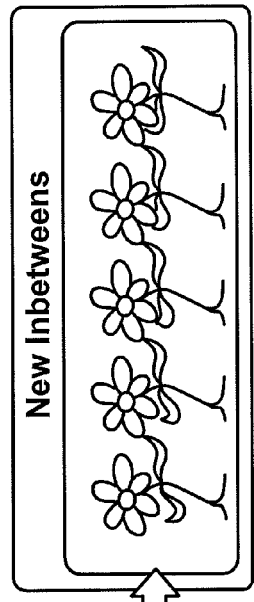

FIGS. 5A-5F provide examples of what graphical representations of possible editing operations in various tools might look like. FIG. 5A illustrates views of what a correspondence editor might display. FIG. 5B illustrates views of what a salient points editor might display. FIG. 5C illustrates views of what a timing specification editor might display. FIG. 5D illustrates views of what a trajectories editor might display. FIG. 5E illustrates views of what an occluded lines drawing editor might display. FIG. 5F illustrates views of a breakdown insertion editor might display. In each of these examples, there are three views, wherein the left-most view is the inbetween frame before editing, the center view illustrates the operation performed, and the right-most view is the inbetween frame after editing.

In order to place the fewest restrictions on the key frame artist, system 100 can take as its input digital scans of hand-drawn key frames as well as supporting the drawing of key frames directly, using for example key frame editor 330 (shown in FIG. 3), which might be a conventional key frame editor.

Since a single drawing can be stored as a graph of strokes, graph builder 302 might include functionality to perform a vectorization step to identify the strokes. Alternatively, the indications of strokes could come from elsewhere. The graph nodes, which correspond to endpoints of strokes (and possibly other salient points), are the junctions where strokes meet or end, and the graph edges correspond to the strokes themselves. In a particular data structure, each endpoint contains pointers to its incident strokes, which are ordered counterclockwise around the endpoint. A stroke S can be expressed as a piecewise linear curve with sample points $V_i$ and an associated thickness $T_i$ at each sample point along the stroke, for $i \in 1, \ldots, n$. We define a stroke's "base" as the line that connects its endpoints, which are the sample points $V_1$ and $V_n$. Additional salient points that are sample points would be $V_j$ where $1>j>n$.

As explained above, inputs to the inbetween computation engine comprise a pair of consecutive key frames and metadata that describes how the frames have been segmented into a graph of nodes that are connected by strokes (of course, it is entirely possible that the engine uses only the metadata, where the key frames are entirely reduced to metadata, e.g., a list of strokes, the locations of their sample points, curve descriptions, width, color, etc.).

The strokes can be represented by finely sampled piecewise linear curves. The user might initiate the automatic correspondence by selecting a pair of strokes that correspond, one from each key frame, or by selecting a region via a selection lasso. When the lasso is used, the most similar pair of strokes within the selected region is chosen automatically. This initial pair provides the seed for a correspondence tracing process (CTP). In each key frame, starting from the selected stroke, the CTP traverses the graph of that key frame in both directions in a depth-first order, respecting the circular order of the incident strokes around nodes. The traversal is performed for both key frames. The recursion stops when a connectivity incompatibility is detected or when two corresponding strokes are too dissimilar.

In one embodiment, the similarity metric uses is an error E between two strokes $S_0$ and $S_1$ based on two different factors, $E_L$ and $E_A$, wherein $E_L$ is the difference in arc-length between the two strokes and $E_A$ is the area of the region bound by the two strokes when they are brought into endpoint alignment, as described later in this section. E is then computed as shown by Equation 1, where L is arc-length, and E is compared against a constant $T_E$ to determine if two strokes are to be deemed similar.

$$E(S_0, S_1) = (E_A + E_L^2)/((L(S_0) + L(S_1))^2) \qquad \text{(Equ. 1)}$$

The inbetween engine will operate on the subgraph of strokes matched by CTP. In tight inbetweening, the two key frames often have identical topology and similar strokes. In such situations, CTP establishes stroke-to-stroke correspondence for a whole connected component of the key frame. In more complex situations, especially where the key frames have different topologies, the artist can use the user tools to provide further correspondence seeds, run CTP again, and then compute inbetweens for missing portions of the key frames. When the lasso selection is used, successive CTP traversals are executed, each time computing the best seed among the remaining strokes not covered by the previous traversals. This continues until no stroke pairs with $E(S_0, S_1) > T_E$ remain.

By default, smooth (subdivided) versions of the key strokes are re-sampled using uniform spacing in arc length so that matched strokes on each key have the same number of sample points. This re-sampling defines the default sample-to-sample correspondence. The artist may insert one or more pairs of matching feature (salient) points, one on each stroke of a matching pair. These inserted points are typically used to force correspondence of salient points. Each inserted salient point might split the stroke so that there becomes a new node in the stroke graph.

Stroke-Based Inbetweening

As is described below in more detail, an inbetween frame can be generated from two (or more) key frames and stroke graphs. For each stroke, the stroke is "moved". Stroke motion processes herein include determining a trajectory for the endpoints of the stroke between key frames, or at least determining locations for the endpoints at some time, t, associated with the inbetween frame being generated. Stroke motion could be done along spiral curves, averages of spiral curves (e.g., averaged over multiple strokes that meet at an endpoint), or along spiral curves defined by parameters taken from averages of spiral curve parameters for each of a plurality of strokes that meet at an endpoint, or other variations. For a given inbetween frame position for the endpoints, a stroke can be deformed to fit those inbetween frame endpoints and match tangent constraints. An example of a tangent constraint is that the angle between two strokes meeting at an endpoint in an inbetween frame need to be in some defined relationship present between those two strokes in one or more of the key frames. For example, the tangent angle in the inbetween frame might be the weighted average of the tangent angles in the key frames, weighted by relative time between the inbetween frame and the key frames. In a particular example, where two strokes meet at an endpoint and are both tangent to a line through the endpoint (i.e., there is no bend in the image between the strokes) in both key frames, that condition should hold true for the inbetween frame, since inbetweening should not normally introduce bends where none were present in the key frames.

Construction of Endpoint Trajectories

The inbetweening engine might use one of two low-level processes for the construction of endpoint trajectories: averages of spiraling endpoint motions or averages of spiral parameters.

Spiraling Endpoint Motions

Consider two endpoints $J_0$ and $K_0$ in an initial key frame and two matching endpoints $J_1$ and $K_1$ in a final key frame. A logarithmic spiral $A(t)$ (illustrated in FIG. 6) that brings $J_0$ to $J_1$ and $K_0$ to $K_1$ can be computed, as follows. The total angle $\alpha$ of the logarithmic spiral is the angle between vectors $J_0K_0$ and $J_1K_1$. The total scaling ratio $\rho$ is $\|J_1K_1\|/\|J_0K_0\|$. The spiral center (fixed point) F is computed by solving the linear system shown in Equation 2 where $R(\alpha)$ is a rotation by angle $\alpha$, and where $S(\rho)$ is a uniform scaling by $\rho$.

$$\overrightarrow{FJ_1} = R(\alpha)S(\rho)\overrightarrow{FJ_0} \quad \text{(Equ. 2)}$$

The determinant of the system is zero (and the fixed point is at infinity) when $J_0K_0 = J_1K_1$, which corresponds to a pure translation and is processed accordingly. The position $P(t)$ of an arbitrary point $P_0$ at time t from the initial key moved by this logarithmic spiral motion is shown by Equation 3.

$$P(t) = A(t)P_0 = F + R(\alpha t)S(\rho^t)\overrightarrow{FP_0} \quad \text{(Equ. 3)}$$

The inverse motion of a point $P_1$ from the final key yields the result shown in Equation 4.

$$P(t) = A^{-1}(1-t)P_1 = F + R(-\alpha t)S(\rho^{1-t})\overrightarrow{FP_1} \quad \text{(Equ. 4)}$$

In this way, the motion of a single stroke's endpoints can be defined. Often, a single endpoint will be the endpoint to more than one stroke, and the endpoint should follow the same trajectory, within a margin of error, regardless of which of the endpoint's adjacent stroke's continuous stroke motion is used. Two example approaches used by the engine to achieve this will now be described.

In one variation, the engine generates a trajectory for an endpoint by determining a trajectory for the endpoint of a first stroke and a trajectory for the endpoint of a second stroke that coincides with the endpoint of the first stroke (and the same for additional strokes if there are any), and then determines an average of those multiple trajectories so that one common trajectory can be used for the endpoint of all the strokes that meet (so that strokes that are attached remain attached through all of the inbetween frames).

In another variation, it is not the trajectories that are averaged, but each trajectory is represented by a set of parameters that, when applied to a curve function, determine the trajectory. A set of parameters are computed for a trajectory for each stroke sharing an endpoint and the parameters are averaged and the average applied to the curve function.

Thus, for the stroke motion using spiral motions, instead of calculating a spiral motion for each stroke and having motion for each endpoint be an average of the spiral motion of the adjacent strokes, the spiral parameters a and p are calculated for each stroke, and then averaged. The end result is that the endpoint motion is actually a spiral motion, not merely a curve computed from spiral motions.

Averaging of Spiral Motion

Given the two endpoints $J_0$, $K_0$, $J_1$, and $K_1$ referenced above, a logarithmic spiral $A(t)$ that brings $J_0$ to $J_1$ and $K_0$ to $K_1$ using the spiraling motion process explained above can be computed. At a time t, the spiral motion puts $J_0$ at $J(t)$ as shown by Equation 5 and puts $K_0$ at $K(t)$ as shown by Equation 6.

$$J(t) = F + R(\alpha t)S(\rho^t)\overrightarrow{FJ_0} \quad \text{(Equ. 5)}$$

$$K(t) = F + R(\alpha t)S(\rho^t)\overrightarrow{FK_0} \quad \text{(Equ. 6)}$$

When the selected subgraph has a single stroke, each node has a single candidate position, and hence the two nodes of the single stroke move along that unique spiral. Now, consider a node P with several incident strokes $S_i$. The spiral motion of each stroke suggests a candidate position $P_i(t)$ of P at time t. The engine computes $P(t)$ as the weighted average $\Sigma w_i P_i(t)$, where $\Sigma w_i = 1$ and $w_i$ are proportional to the average of the distances between the endpoints of $S_i$ in both key frames. As explained elsewhere herein, these resulting node trajectories may be edited by the artist.

Averaging of Spiral Motion Parameters

Alternatively, instead of using a weighted average of the different points calculated for different strokes, an inbetweening engine can average parameters of curves. For example, in the examples above, the spiral curve for an endpoint of stroke $S_0$ can be represented by a total angle $\alpha$ of a logarithmic spiral, a total scaling ratio $\rho$, and a spiral center F computed by solving a linear system. Likewise, the spiral curve for an endpoint of another stroke, $S_1$, coincident with the endpoint of stroke $S_0$, can be represented in a similar manner. An "average" curve to be used as the trajectory of the endpoint might be the curve defined by averages of those parameters $\alpha$ and $\rho$.

Stroke Deformation

With two matching key frame strokes and the positions $J(t)$ and $K(t)$ of the two endpoints of the current stroke at time t available, the inbetweening engine can then compute the shape of the current stroke for the desired inbetween frame being generated. The simplest approach could be to use a linear interpolation of edge lengths between corresponding key edges of the edge-edge angle between corresponding key sample points, as proposed in [Sederberg]. A new curve may be reconstructed trivially so that it has the interpolated edge-length and angles. This is a discrete version of curvature interpolation [Surazhsky]. Then, the curve may be simply fitted (i.e., rotated, scaled and translated) so that its endpoints match $J(t)$ and $K(t)$.

In another approach, the inbetweening engine simply transforms the initial stroke by $A(t)$ and the final stroke by $A^{-1}(1-t)$. The transformed strokes would have the same endpoints, but possibly different shapes. The current stroke for the inbetween frame can be computed as the average or the two using the curve averaging process with weights $(1-t)$ and t.

Note that this approach differs from approaches based on local Laplace coordinates [Fu] as it does not require solving for the desired curve. Two examples are shown in FIG. 7, where the two key frames are drawn as thick curves. In the "wagging" case, the user has specified a feature-point pair to establish the correspondence between the tips of the tail.

To average two or more curves with identical endpoints, the engine proceeds as follows. It closes each curve by adding an edge between its endpoints. On each curve i, for each sample point $C_i$ (excluding the endpoints), compute the sample point's coordinates $(x_i, y_i)$ in the local frame defined by its two predecessors, $A_i$ and $B_i$, along the curve, as illustrated in Equations 7 and 8.

$$x = \overrightarrow{A_iC_i} \cdot \overrightarrow{A_iB_i} \quad \text{(Equ. 7)}$$

$$y = \overrightarrow{A_iC_i} \cdot (R(\frac{\pi}{2})\overrightarrow{A_iB_i}) \quad \text{(Equ. 8)}$$

Then, the engine computes the local coordinates for each sample point C of the average curve as a weighted average of local coordinates of the corresponding sample points $C_i$ in the input curves. Now, starting with the two endpoints, reconstruct one proposed sample point at a time of the average curve from these interpolated coordinates as illustrated in Equation 9.

$$C = A + x_t\overrightarrow{AB} + y_t R(\frac{\pi}{2})\overrightarrow{AB} \quad \text{(Equ. 9)}$$

Next, the engine performs this process in the reverse order along the curve, hence obtaining a second candidate position for C. Then, it computes a linear blending of these two positions, as illustrated in FIG. 6. As illustrated there, piecewise linear curves (strokes) with identical endpoints are interpolated in local coordinates at each mutual endpoint. At any time t, the interpolated stroke (darker line) can be reconstructed separately from the left and the right, and then blended (center) to produce a curve that remains fixed at the endpoints. The blending ratio varies linearly with the average of the relative arc-length parameters along the respective curves, giving more weight to the forward reconstruction at the beginning of the curve and more weight to the reverse construction at the end of the curve.

In some embodiments, the stroke is defined by a piecewise linear chain of samples ("polylines") where the parameters defining the samples of the curve for a given time are computed through interpolation of parameters defining corresponding samples in the initial and final curves. The strokes can be linear interpolation of Euclidean coordinates, curvature interpolation, and/or Laplace coordinates, or other curves. The interpolation can operate on local coordinates of each sample in the coordinate system of a neighboring edge or can use a global coordinate system. One specific embodiment is where a linear interpolation of Euclidean coordinates is used to combine two interpolations of local coordinates, each computed from a different direction along the curve. Weights in the linear combination may vary with time and position along the curve.

Alternative Stroke Deformation

In another approach, to average two or more curves with identical endpoints, the engine instead proceeds using the following three steps:

1) Intrinsic Shape Interpolation: The curve representing the stroke in the first key frame is represented in memory as a sequence of angles and edge lengths beginning from one endpoint and proceeding to the other endpoint. Of course, as the endpoints move as the target inbetween frame moves from the first key frame to the second key frame, the curve may not line up with the endpoints.

2) Curve Fitting: As the reconstructed curve will not necessarily pass through the endpoints defined by spiral motion, the reconstructed curve is scaled and rotated to fix this.

3) Tangent Aligning Warp: A Twist warp, or similar warp is performed to ensure continuity at the stroke endpoints or to otherwise meet tangent constraints.

The results are very similar in most cases to the curve averaging, but the third step produces better results at the joins under some conditions.

Specific Implementation

Figure 8:
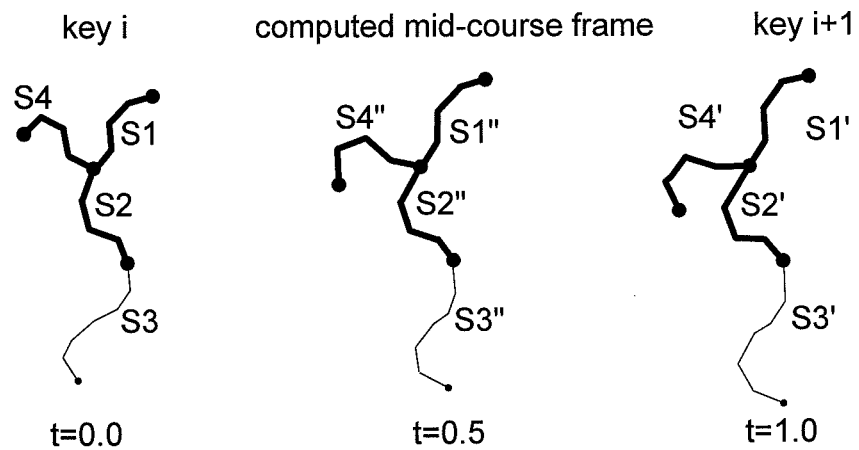
FIG. 8 illustrates a stroke graph in two key frames and in an inbetween frame.

A more detailed explanation of stroke deformation using spiral trajectories of endpoints and other sample points will now be described in this section. FIG. 8 illustrates a stroke in a first key frame (FIG. 8(a)), a corresponding stroke in a second key frame (FIG. 8(c)) and the computed stroke (FIG. 8(b)) that an animation engine might generate for an inbetween frame. As explained elsewhere, the animation system might allow for an artist to provide other inputs that would influence the process, but in this example, those are not shown.

In this example, the time scale is t=0 for the first key frame, t=1 for the second key frame and some intermediate value of t for the inbetween frame. In this example, t=0.5 is used, but other values would be used for other timing. As part of the process, the images of the key frames are represented as a set of strokes and correspondences are determined. In the example of FIG. 8, there are four strokes, labeled S1, S2, S3 and S4, wherein Sn refers to a stroke in the first key frame, Sn' refers to a stroke in the second key frame, and Sn" refers to a generated stroke in the inbetween frame. Note that in this specific example, each corresponding stroke is approximated by polylines with identical numbers of corresponding internal sample points, but in other examples, this might not be the case and/or strokes without correspondence might exist due to occlusion or other reasons. The black dots in the figure indicate stroke endpoints where a stroke ends or where two or more strokes meet.

In some cases, such as between strokes S2 and S3, the endpoint splits a smooth curve. It may be that the endpoint is present because it was earlier identified by an artist or by a computer process as a "salient point" in order to force correspondence or to control the motion of the strokes directly. When two incident strokes meet smoothly in the two key frames, that smoothness should be preserved in all inbetween frames. This can be accomplished using tangent constraints.

In some cases, two strokes such as S1 and S2 may also meet smoothly at an endpoint with more than two incident strokes (S4 also meets at that endpoint). This might be due to, for example, S4 having been occluded by the continuous S1-S2-S3 silhouette. Again, the smoothness at the S1-S2 junction should preferably be preserved in the inbetween frames.

These requirements and preferences are driven by artistic concerns and thus technical solutions to these constraints are often not found in works that are driven by other concerns. For example, others have provided solutions to problems of morphing between given shapes, but have different solutions. In general, the graph of strokes and endpoints (of which FIG. 8 is but one example) forms a one-dimensional complex that splits the plane into regions that may each have a disconnected and non-manifold boundary. Hence, the inbetweening problem addressed here is significantly different from the related problem of morphing between two-manifold regions of the plane as might be used to morph closed regions for animation or used for medical slice interpolation and the like. For example, techniques that strive to preserve rigidity by morphing compatible triangulations of two-manifold regions or techniques based on medial decompositions might not be easily harnessed to address the inbetweening issue.

One reason is that inbetweening graphs often represent partial occlusions. For example, the change of the portion of a background torso seen between two clapping hands does not follow any rigidity-preserving rule. To overcome this, morphing networks of curves can be preferable to morphing boundaries of closed regions.

To address the various constraints described herein, a new inbetweening approach has been developed that can be operated by a computer or computing device to automatically or semi-automatically generate inbetween frames. In such a process for computing an inbetween frame at time t, first two key frames are identified and the relative timing between the key frames and the time t is determined (time t might just be represented as a number between 0 and 1, or might vary for different parts of the inbetween frame), and the process operates on subgraphs of two consecutive key frames that have identical topologies and for which correspondence has been established.

The process of computing an inbetween frame at time t in a particular embodiment involves the following five steps, in this example:

1. Computing current (i.e., at time t) positions of all endpoints.
2. Computing the intrinsic shape of all strokes.
3. Transforming the strokes so that their ends match their corresponding endpoints.
4. Computing the desired tangent direction at each end of each stroke.
5. Warping the strokes so that endpoint tangents match the desired tangent directions.

This process combines "stroke motion" and "stroke deformation" processes. Steps 1 and 3 define the stroke motion (in step 3, the transformation results in the stroke ends matching the current time t positions of their corresponding endpoints), and steps 2, 4 and 5 define the stroke deformation, i.e., deforming the strokes to fit the determined endpoints calculated in the other steps.

Figure 9:
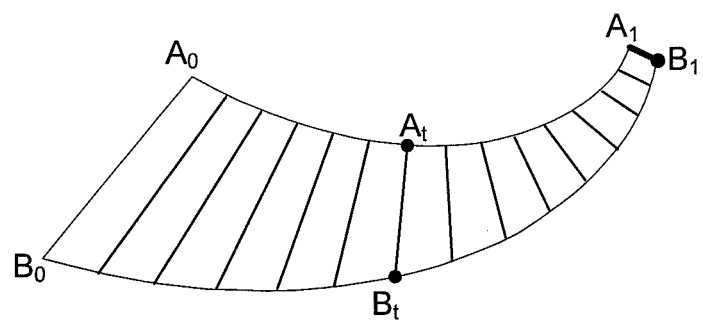
FIG. 9 illustrates spiral curves.

As for step 1, the "current" position of an endpoint of a stroke can be determined by considering the two endpoints in each of the two key frames. Logarithmic spirals are used in this example because animation artists prefer natural, arched motions, but other spirals are possible. For this process, logarithmic spirals might tend to yield more realistic results than Archimedean spirals when used to approximate motions of the screen-projections of shapes that approach or move away from the viewpoint and hence grow or shrink in a non-linear manner due to perspective. An example of a logarithmic spiral motion that maps (the two endpoints of) an initial edge $A_0$-$B_0$ onto (the two corresponding endpoints of) a final edge $A_1$-$B_1$ is shown in FIG. 9. The trajectories of the endpoints are shown as the upper curve (for endpoint A at various times) and as the lower curve (for endpoint B at various times).

Given the initial position $A_0$ of an endpoint and its final position $A_1$, the engine can compute the position $A_t$ of the endpoint at time t using a logarithmic spiral motion, which is the combination of a rotation $R(\alpha t)$ by angle $\alpha t$ and a scaling $S(\rho^t)$ by a factor $\rho^t$, both with respect to a fixed point F. The process involves the following steps:

(1) for each stroke $S^i$ incident upon the endpoint A, compute the sum $L^i$ of the arc lengths of $S_0$ and $S_1$; then, compute the total $L_T$ of these lengths and the weights $$w^i = \frac{L^i}{L_T};$$

(2) For each stroke $S^i$ with endpoints A and B, compute the angle $\alpha^i$ between $\overrightarrow{A_0B_0}^i$ and $\overrightarrow{A_1B_1}^i$ and the scaling $$\rho = \frac{\|\overrightarrow{A_1B_1^i}\|}{\|\overrightarrow{A_0B_0^i}\|};$$

(3) Next, compute the weighted average angle $\alpha = \Sigma w^i \alpha^i$ and scale $\rho = \Sigma w^i \rho^i$; and (4) Finally, compute the fixed point F by solving the linear system $\overrightarrow{FA_1} = R(\alpha)S(\rho)\overrightarrow{FA_0}$ of two unknowns, which are the coordinates of F.

Figure 10:
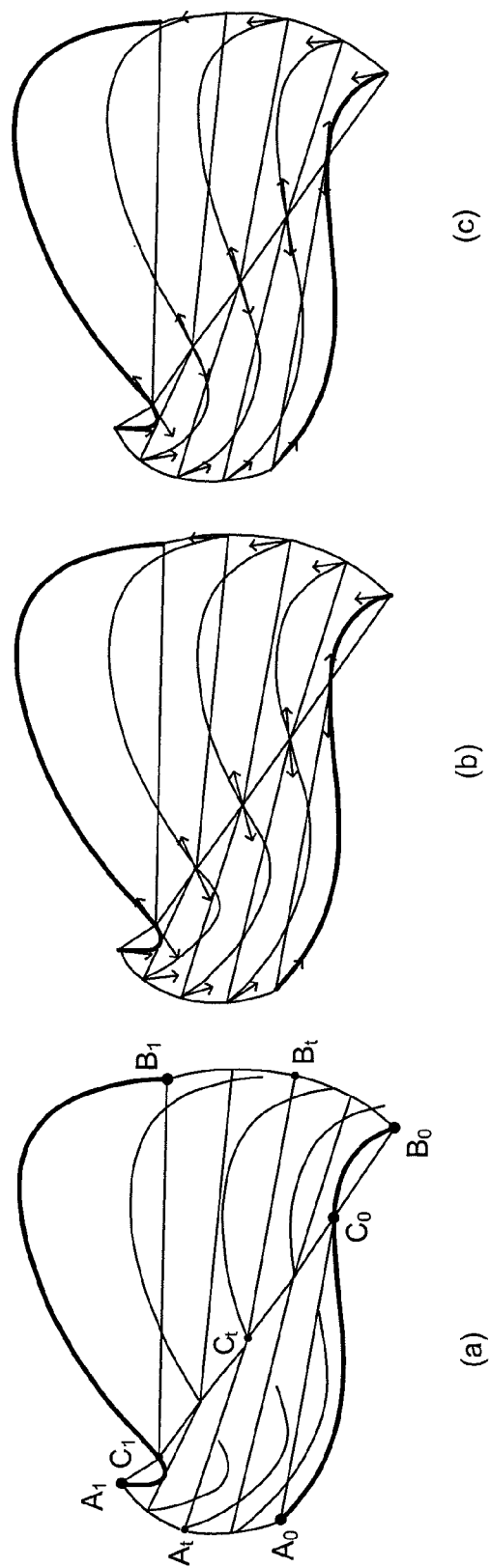
FIG. 10 illustrates stroke deformation to match endpoints.

As for step 2, given the initial shape $S_0$ and the final shape $S_1$ of a stroke S, the intrinsic shape $S_t$ that the stroke would take at time t is computed. In one approach, $S_t$ starts at the now-known point $A_t$ for one of the stroke's endpoints and proceeds along a path defined by edge-lengths and sample-point-angles that are computed through linear interpolation of the corresponding measures on $S_0$ and $S_1$. [Sederberg] suggests a related approach. Note that where the two endpoints of stroke S are moving, it is not usually the case where the end of the path, after all edge-lengths and sample-point-angles are traversed, would land exactly on the opposite endpoint. An example of this is shown in FIG. 10(a), which shows three inbetween strokes between two (darker shaded) key frame strokes. Then endpoints at the left match, but the ones on the right do not. As that example curve comprises one internal stroke sample point (so two paths, each defined by a list of edge-lengths and sample-point-angles, with C representing the internal stroke sample point), the inbetween curve is right on at the sample point (represented by the line segment $C_0$-$C_1$), but is discontinuous.

Step 3 solves this issue by, for example, a transformation of strokes wherein the intrinsic shape S of the stroke reconstructed as described above is transformed by a rotation around $A_t$ by angle $\angle(A_tB, A_tB_t)$ followed by uniform scaling by $\|A_tB_t\|/\|A_tB\|$ with respect to $A_t$. After that transformation, the last sample point of stroke S is now at the desired place $B_t$ for each inbetween frame, as illustrated by FIG. 10(b). Using only these first three steps to produce the inbetween frames yields pleasing morphs that preserve the continuity of the stroke graph, but may fail to preserve smoothness of adjacent strokes. This is addressed by the next two steps.

In step 4, assume that the angle of the tangent at an endpoint varies exponentially over time and compute the desired tangent direction of a stroke at its endpoint by interpolating its polar representation in the two key frames.

In step 5, to ensure that adjacent strokes remain smoothly connected throughout the morph, warp them to ensure that the tangents at their endpoints match the desired tangent directions of the current inbetween frame. An example is shown in FIG. 10(c). One process for performing this step is to "move" each endpoint P of stroke S to $P+(P_L-P)+(P_R-P)$, or equivalently to $P_L+(P_R-P)$.

This can be done by computing $P_L$ and $P_R$ as follows. Assume that the angle between the actual and desired normal at $A_t$ is $\alpha_L$. Assume that d is the total arc length of the stroke and that $d_L$ is the arc length of the portion of the stroke between $A_t$ and P. $P_L$ is the image of P by a rotation of angle $\alpha_L \cos^2((\pi/2)(d_L/d))$ around $A_r$. $P_R$ is the image of P by a rotation of angle $\alpha_R \cos^2((\pi/2)((d_R)/d))$ around $B_r$, where $\alpha_R$ is the angle between the actual and desired normal at $B_r$.

This approach is fast, since it does not require numeric iterations or other optimizations, and produces pleasing results that ensure normal continuity across smooth junctions between stokes and preservation of features that are present in both key frames.

Artist Inputs

Although the system described herein can compute a continuous model of an animation that interpolates two such stroke graphs, artists may prefer intuitive tools that allow for controlling such an animation model without having to directly through the model through control points or abstract parameters, because such affordances do not match the highly specialized stroke-drawing skills that the artists bring to the process. Artist input to the system described herein might, for example, be a set of vectorized models of the key frames and to inbetween strokes or endpoint trajectories drawn by the artist to guide or override the automatic process.

Artists may wish to control the continuity of the animation across key frames. Continuity of velocity in the trajectory of a mutual endpoint as it passes a key could be enforced programmatically by using an interpolating spline model for mutual endpoint trajectories, i.e., "J-splines". However, artists are accustomed to using timing charts (which specify the spacing in time between key frames) to achieve a precise control of velocity between key frames. They may prefer to retain this control. Adjusting the spacing between consecutive inbetween frames automatically based on four or more key frames could produce surprising or inacceptable results. In such cases, it might be preferred to limit inbetweening to computing inbetween frames from only two key frames (one preceding and one following the desired inbetween frame) and striving to produce a steady evolution of these inbetween frames over time. Trivially decomposing the problem into one of computing independent morphs between corresponding strokes would not work, because such an approach would not preserve the connectivity of the strokes and the smoothness at their junctions.

Analysis of Results

The inbetweening engine and editing tools described herein allow for full automation of the production of inbetweens where possible. As the level of complexity in the drawings increases, the system supports intuitive and direct input from the artist to guide the automation and thus works toward the goal of having the level of interaction or "touch time" to reflect the complexity of the drawing problems presented by the key frames.

Figure 4:
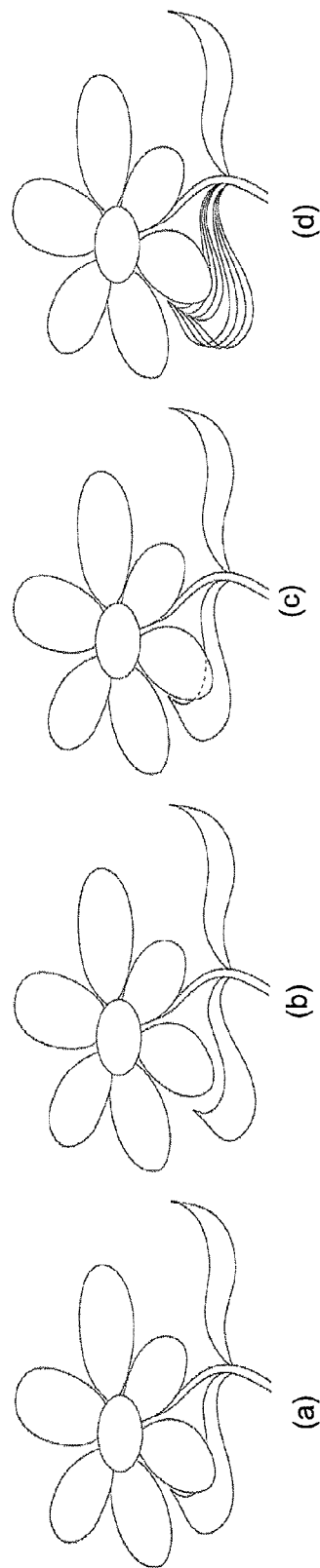
FIG. 4 illustrates an animation sequence including occluded strokes and a display of a sequence of stroke positions.

In cases where the user desires, or is required, to guide the system, he/she draws a series of "guide strokes" and/or indicates edits with mouse clicks and using the sum of the guide strokes and input mouse clicks as an "interaction count", if each of a pair of key frames has n strokes and there are k inbetweened frames, then in a totally manual system, the artist would have to hand draw kn strokes to create the inbetweens. If the system produces fully automated results that are acceptable, that is a 100% gain in efficiency. If the user needs to perform i interactions to guide the system, the gain is (kn−i)/kn. In a test run, there was an average of 153 strokes in a key frame and 16 interactions with the automatically generated inbetweens, resulting in a 96% efficiency gain.

Where the movement is pure rigid body motion, it is likely that no editing will be required, so there would be 100% efficiency gain. FIG. 4 presents more challenging topological problems. One example of a difficulty is where a continuous stroke in some frames breaks into distinct strokes when there is an occlusion. The rightmost drawing in FIG. 4 is a visualization of the automatically generated trajectories, illustrating the smooth arcs generated by the interpolation.

Figure 11:
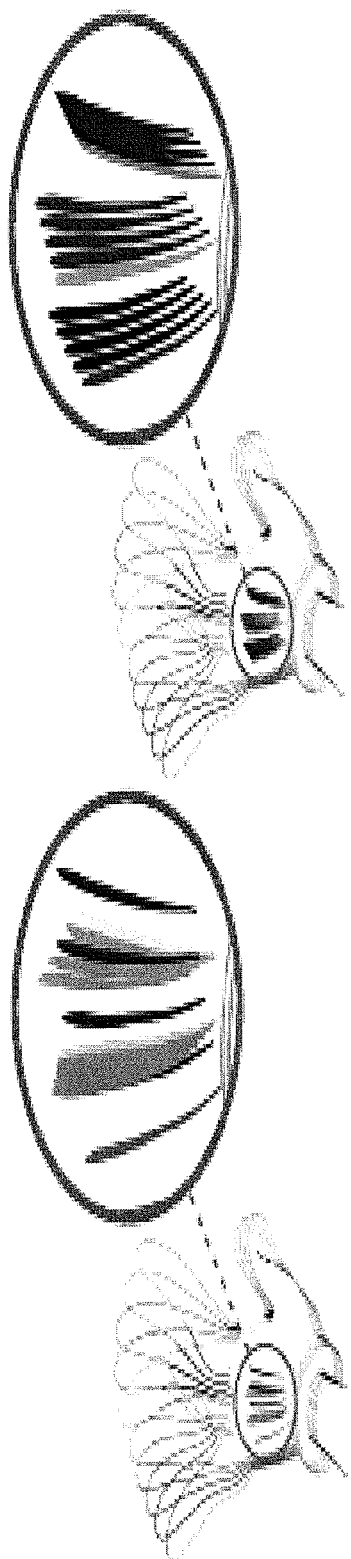
FIG. 11 shows interpolation and final results after user input to guide correspondence.

Sometimes, the automatic process is unable to correctly establish correspondence for all strokes. FIG. 11 shows the initial interpolation (on the left) and the final results (on the right) after the user has manually specified three correspondences to guide the matching.

As has now been described, a semiautomatic inbetweening system can generate inbetween images for use as is or for further editing by an artist. In generating an inbetween frame, the system takes into account the timing between the inbetween frame and the key frames on either side of it in the timeline, as well as a graph mapping strokes of one key frame to strokes of another key frame. For a pair of strokes, the stroke can be moved from its position in a first key frame to its position in a second key frame through time, thus defining its location at the time of an inbetween frame. The stroke motion could be defined by paths taken by the stroke's endpoints. Those endpoints can follow spirals or other paths. Where endpoints of more than one stroke are attached at a mutual endpoint in the first key frame and the second key frame, the path can be such that the endpoints remain attached throughout the movement, i.e., all of the endpoints that are attached at the mutual endpoint remain attached (or nearly so) by following the same path (or nearly so). The path may be an average of the paths that the endpoints would take if moved independently, or the independent paths may be parameterized and the common path defined by a curve using parameters that are averages of parameters of each of the independent paths. Averages can be weighted.

In addition to stroke motion, stroke deformation can be done by the inbetweening system such that a stroke is deformed when the shape of the stroke is not identical in the key frames. Stroke deformation might be done with curve averaging or intrinsic shape interpolation, transformation to match ends and tangent warping. For example, where a simple rigid transformation of a stroke between two key frames does not satisfy constraints, the stroke might be transformed so that endpoints that met at mutual endpoints do so for the inbetween frame even as the mutual endpoints move and that tangent relationships between strokes that meet at a mutual endpoint are preserved (which might or might not involve smoothly moving the angles).

The system also might provide for user input, thereby allowing an artist to view automatic inbetween frames generated from input key frames and then edit the result, either directly or by allowing for artist input of alterations to the key frames, the strokes, the graph of strokes, and/or metadata about the key frames, strokes, etc. and having the system automatically regenerate the automatic inbetween frames generated from the edited inputs.

Further embodiments can be envisioned to one of ordinary skill in the art after reading this disclosure. In other embodiments, combinations or sub-combinations of the above disclosed invention can be advantageously made.

For example, the shape of any object made of nonrigid material (including flesh) changes during motion. The technique of squash and stretch takes this concept to heart, and often to the extreme, with one important caveat: the object's volume must remain constant. Inbetweened drawings should maintain this invariant where possible and in some embodiments, this is taken into account. For more extreme motions, especially for the inbetweening of effects such as highlights and shadows representing blobby masses, a shape-based approach might prove to be more powerful. In yet another embodiment, a hybrid approach can be used incorporating deformation at both the stroke and shape levels.

The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. In a computer-assisted animation system, a method for generating inbetween frames, wherein an inbetween frame is an image within an animation sequence that is to be displayed in sequence between two key frames drawn by an artist, and wherein the inbetween frames are to be initially at least partly computer generated, the method comprising:

receiving a set of at least two key frames, including a first key frame that is to precede an inbetween frame set comprising at least one generated inbetween frame in the animation sequence, and a second key frame that is to follow the inbetween frame set in the animation sequence;

analyzing elements of the set of key frames to identify strokes in images that are represented by the set of key frames, wherein a stroke is an image feature that is representable, in part, by a continuous curve segment with endpoints and zero or more additional sample points on the curve segment that has an associated thickness, wherein a result of analyzing is a generation of a stored list of strokes;

determining corresponding stroke pairs, a stroke pair comprising the first stroke of a first key frame of the set of key frames and a second stroke of the second key frame of the set of key frames;

for each of a plurality of the corresponding stroke pairs, computing a continuous stroke motion for moving the endpoints of the first stroke of the stroke pair in the first key frame to a position of the endpoints of the second stroke in the second key frame, wherein the continuous stroke motion is defined by motions of the endpoints of the first stroke and the endpoints of the second stroke;

for each of a plurality of mutual endpoints, wherein a mutual endpoint is an endpoint of two or more strokes in the first key frame and/or second key frame that form meeting strokes, adjusting the continuous stroke motion of the meeting strokes such that the adjustment results in the continuous stroke motion coinciding, or at least coinciding within a margin of error, at the mutual endpoint such that the mutual endpoint would follow the same path, within a margin of error, regardless of which of the mutual endpoint's stroke's continuous stroke motion is used;

determining an animation time for a desired inbetween frame relative to the animation times of the first key frame and the second key frame;

determining a location of endpoints given the animation time of the desired inbetween frame and continuous stroke motion;

automatically generating strokes of the desired inbetween frame from at least the determined endpoint locations; and storing the automatically generated strokes in a form that allows for later electronic editing of the desired inbetween frame.

2. The method of claim 1, wherein automatically generating strokes of the desired inbetween frame from at least the determined mutual endpoint locations further comprises automatically generating strokes of the desired inbetween frame from at least the determined mutual endpoint locations and locations of non-endpoint sample points of the first and/or second stroke, deformed according to a stroke deformation process that deforms a stroke at least when a shape of the first stroke is not identical to a shape of the second stroke.

3. The method of claim 2, wherein stroke-deformation is performed using a combination of more than one stroke deformation.

4. The method of claim 3, wherein the combination of stroke-deformations comprises a stroke deformation that starts with the first stroke and moves toward the position of the second stroke and a stroke deformation that starts with the second stroke and moves toward the position of the first stroke.

5. The method of claim 4, wherein the combination of stroke-deformations comprises four stroke deformations, two for a first-to-second stroke direction and two for a second-to-first stroke direction, wherein each set of two deformations comprises one deformation that uses a representation of the stroke that starts with a first endpoint of the stroke and one deformation that uses a representation of the stroke that starts with a second endpoint of the stroke.

6. The method of claim 4, wherein:
the second stroke is transformed by the inverse of a stroke-motion;
following the transformation, stroke-deformation is computed to form a deformed stroke; and
the deformed stroke is transformed by a fraction of the stroke-motion.

7. The method of claim 1, wherein adjusting the continuous stroke motion comprises averaging the continuous stroke motion of the endpoint determined with respect to the first stroke and the continuous stroke motion of the endpoint determined with respect to the second stroke.

8. The method of claim 1, wherein the at least two key frames are exactly two key frames.

9. The method of claim 1, further comprising:
displaying the generated inbetween frame image;
accepting modification input from an artist; and
modifying the inbetween frame image according to the modification input.

10. The method of claim 9, wherein the modification input comprises modifications to endpoint trajectories and modifications to stroke pairs.

11. The method of claim 1, wherein determining corresponding stroke pairs comprises optionally merging in each key frame groups of contiguous strokes into one stroke each, identifying a plurality of strokes of the first key frame and matching each stroke therein to one strokes of the second key frame.

12. The method of claim 1, wherein each endpoint motion is a weighted average of stroke motions that interpolate pairs of corresponding incident strokes, where the stroke motion is constrained to be the mapping between time and a similarity transform.

13. The method of claim 12, wherein the mapping is a spiral.

14. The method of claim 12, wherein the mapping is a logarithmic spiral.

15. The method of claim 1, wherein automatically generating strokes of the desired inbetween frame from at least the determined endpoint locations further comprises automatically generating strokes of the desired inbetween frame from at least the determined endpoint locations and locations of non-endpoint sample points of the first and/or second stroke, deformed according to a stroke deformation process that deforms a stroke at least when a shape of the first stroke is not identical to a shape of the second stroke, and wherein stroke-deformation is performed using one or more stroke deformations.

16. The method of claim 15, wherein the first stroke is deformed by applying a fraction of a deformation that would progressively deform the first stroke to take the shape of the corresponding stroke in the second frame, where the deformation progressively bends and stretches the shape of the stroke from forward in time to back in time or from back in time to forward right to left and wherein the fraction of the deformation corresponds to a proportion of the time lapse between the inbetween frame and the first key frame and the time lapse between the second key frame and the first key frame.

17. The method of claim 16, wherein the deformation process is applied both from a first endpoint to a second endpoint and from the second endpoint to the first endpoint and wherein the resulting strokes are blended into a unique stroke.

18. The method of claim 17, wherein the blending is performed using a weighted average of corresponding samples on each of the above mentioned resulting strokes, wherein the weights vary with the position of the sample along the stroke.

19. The method of claim 16, wherein the bending of the stroke is performed by using representations of all strokes wherein each sample is represented by a shape descriptor expressed in terms of a plurality of neighboring samples along the stroke.

20. The method of claim 19, wherein the shape descriptor comprises the local coordinates of the sample in the coordinate system defined by the two proceeding samples along the stroke or by the two succeeding samples along the stroke.

21. The method of 20, wherein the proceeding and succeeding samples are obtained by considering that the stroke samples, including the stroke endpoints, are treated as a cycle.

22. The method of claim 1, further comprising accepting, from an artist, inputs to indicate stroke matches, endpoint matches, stroke orientation, and/or endpoint trajectories.

23. The method of claim 1, further comprising accepting, from an artist, inputs to indicate stroke divisions.

24. The method of claim 1, wherein sample points representable with an associated thickness are also represented with an associated color attribute.

25. The method of claim 1, wherein determining correspondences between strokes of one key frame of the set of key frames and the strokes of another of the set of key frames is done by a human artist.

26. The method of claim 1, wherein determining correspondences between strokes of one key frame of the set of key frames and the strokes of another of the set of key frames is done by computer hardware or computer software.

27. In a computer-assisted animation system, a method for generating inbetween frames, wherein an inbetween frame is an image within an animation sequence that is to be displayed in sequence between two key frames drawn by an artist, and wherein the inbetween frames are to be initially at least partly computer generated, the method comprising:
receiving a set of at least two key frames, including a first key frame that is to precede an inbetween frame set comprising at least one generated inbetween frame in the animation sequence and a second key frame that is to follow the inbetween frame set in the animation sequence;
analyzing elements of the set of key frames to identify strokes in images that are represented by the set of key frames, wherein a stroke is an image feature that is representable, in part, by a continuous curve segment, two endpoints and zero or more additional sample points on the curve segment that has an associated thickness, wherein a result of analyzing is a generation of a stored list of strokes;
determining corresponding stroke pairs, a stroke pair comprising the first stroke of a first key frame of the set of key frames and a second stroke of the second key frame of the set of key frames;
for each of a plurality of the corresponding stroke pairs, computing a stroke deformation for deforming the first stroke of the stroke pair in the first key frame to fit a position of the second stroke in the second key frame, wherein the stroke deformation is performed according to a stroke deformation process that deforms a stroke at least when a shape of the first stroke is not identical to a shape of the second stroke;
determining an animation time for a desired inbetween frame relative to the animation times of the first key frame and the second key frame;
determining a location of endpoints given the animation time of the desired inbetween frame and continuous stroke motion;
automatically deforming strokes of the desired inbetween frame to fit the endpoints; and
storing the automatically deformed strokes in a form that allows for later electronic editing of the desired inbetween frame.

28. The method of claim 27, wherein a stroke deformation comprises curve averaging.

29. The method of claim 27, wherein a stroke deformation comprises four stroke deformations, two for a first-to-second stroke direction and two for a second-to-first stroke direction, wherein each set of two deformations comprises one deformation that uses a representation of the stroke that starts with a first endpoint of the stroke and one deformation that uses a representation of the stroke that starts with a second endpoint of the stroke.

30. The method of claim 27, wherein stroke deformation comprises:
intrinsic shape interpolation;
transforming the stroke to match endpoints; and
tangent warping to match endpoint tangents or other tangent constraints.

31. A computer-assisted animation system comprising:
an input for receiving at least two key frames, comprising a first key frame and a second key frame such that the computer-assisted animation system is to generate initial representations of at least one inbetween frame, wherein an inbetween frame is an image within an animation sequence that is to be displayed in sequence between the first and second key frames;

logic for reading in a stored description of strokes or analyzing elements of the set of key frames to identify strokes in images that are represented by the set of key frames, wherein a stroke is an image feature that can be represented, in part, by a continuous curve segment, two endpoints and zero or more sample points on the curve segment that have an associated thickness and zero or more additional attributes, to result in the stored description of strokes;

logic for reading in or determining corresponding stroke pairs, a stroke pair comprising a first stroke of the first key frame of the set of key frames and a second stroke of the second key frame of the set of key frames;

logic for computing a continuous stroke motion for each of a plurality of the corresponding stroke pairs, wherein a continuous stroke motion describes motion of the first stroke of the stroke pair in the first key frame to a position of the second stroke in the second key frame, wherein the continuous stroke motion is defined by the endpoints of the first stroke and the endpoints of the second stroke;

logic for computing continuous stroke motion adjustments for each of a plurality of mutual endpoints, wherein a mutual endpoint is a point where two or more strokes in the first key frame meet and has a corresponding mutual endpoint in the second key frame, such that the adjustments result in the continuous stroke motion coinciding, or at least coinciding within a margin of error, at the mutual endpoint such that the mutual endpoint would follow the same path, within a margin of error, regardless of which of the mutual endpoint's stroke's continuous stroke motion is used;

logic for determining a location of mutual endpoints given the animation time of the desired inbetween frame and continuous stroke motion;

logic for automatically generating strokes of the desired inbetween frame from at least the determined mutual endpoint locations; and electronic storage for data representing the automatically generated strokes in a form that allows for later electronic editing of the desired inbetween frame.

32. The computer assisted animation system of claim 31, further comprising logic for automatically generating strokes of the desired inbetween frame from at least the determined mutual endpoint locations and locations of non-endpoint sample points of the first and/or second stroke, deformed according to a stroke deformation process that deforms a stroke at least when a shape of the first stroke is not identical to a shape of the second stroke.

33. The computer assisted animation system of claim 31, further comprising logic for averaging the continuous stroke motion of the endpoint determined with respect to the first stroke and the continuous stroke motion of the endpoint determined with respect to the second stroke.

34. The computer assisted animation system of claim 31, further comprising:
logic for displaying the generated inbetween frame image;
logic for accepting modification input from an artist; and
logic for modifying the inbetween frame image according to the modification input.

35. The computer assisted animation system of claim 34, wherein the modification input comprises modifications to endpoint trajectories and modifications to stroke pairs.

36. The computer assisted animation system of claim 31, wherein each endpoint motion is a weighted average of stroke motions that interpolate pairs of corresponding incident strokes, where the stroke motion is constrained to be the mapping between time and a similarity transform.

37. The computer assisted animation system of claim 36, wherein the mapping is a logarithmic spiral.

38. The computer assisted animation system of claim 31, further comprising logic for automatically generating strokes of the desired inbetween frame from at least the determined endpoint locations and locations of non-endpoint sample points of the first and/or second stroke, deformed according to a stroke deformation process that deforms a stroke at least when a shape of the first stroke is not identical to a shape of the second stroke, and wherein stroke-deformation is performed using one or more stroke deformations.

39. The computer assisted animation system of claim 38, further comprising logic for deforming the first stroke by applying a fraction of a deformation that would progressively deform the first stroke to take the shape of the corresponding stroke in the second frame, where the deformation progressively bends and stretches the shape of the stroke from forward in time to back in time or from back in time to forward right to left and wherein the fraction of the deformation corresponds to a proportion of the time lapse between the inbetween frame and the first key frame and the time lapse between the second key frame and the first key frame.

40. The computer assisted animation system of claim 31, wherein sample points representable with an associated thickness are also represented with an associated color attribute.

41. In a computer-assisted animation system, a method for generating inbetween frames, wherein an inbetween frame is an image within an animation sequence that is to be displayed in sequence between two key frames drawn by an artist, and wherein the inbetween frames are to be initially at least partly computer generated, the method comprising:

receiving a set of at least two key frames, including a first key frame that is to precede an inbetween frame set comprising at least one generated inbetween frame in the animation sequence, and a second key frame that is to follow the inbetween frame set in the animation sequence;

generating a stored list of strokes from elements of the set of key frames, wherein a stroke is an image feature that is representable, in part, by a continuous curve segment with endpoints and zero or more additional sample points on the curve segment that has an associated thickness;

determining corresponding stroke pairs, a stroke pair comprising the first stroke of a first key frame of the set of key frames and a second stroke of the second key frame of the set of key frames;

for each of a plurality of the corresponding stroke pairs, computing a continuous stroke motion for moving the endpoints of the first stroke of the stroke pair in the first key frame to a position of the endpoints of the second stroke in the second key frame, wherein the continuous stroke motion is defined by motions of the endpoints of the first stroke and the endpoints of the second stroke;

for each of a plurality of mutual endpoints, wherein a mutual endpoint is an endpoint of two or more strokes in the first key frame and/or second key frame that form meeting strokes, adjusting the continuous stroke motion of the meeting strokes such that the adjustment results in the continuous stroke motion coinciding at least within a margin of error, at the mutual endpoint such that the mutual endpoint would follow the same path, within a margin of error, regardless of which of the mutual endpoint's stroke's continuous stroke motion is used; and using adjusted continuous stroke motion of the meeting strokes in generating the inbetween frames.

* * * * *